United States Patent [19]

Chang

[11] Patent Number: 5,867,502
[45] Date of Patent: Feb. 2, 1999

[54] METHOD AND SYSTEM FOR INTERFACING AN ATM SWITCH AND AN OPTICAL NETWORK WHEREIN BANDWIDTH IS MAXIMIZED AND NON-LOCAL DATA STREAMS ARE GROUPED INTO DESTINATION GROUPS

[75] Inventor: Ning Chang, Atlanta, Ga.

[73] Assignee: BellSouth Corporation, Atlanta, Ga.

[21] Appl. No.: 601,962

[22] Filed: Feb. 15, 1996

[51] Int. Cl.[6] .................................. H04J 3/18; H04J 3/02; H04L 12/28; H04L 12/56
[52] U.S. Cl. ......................... 370/477; 370/401; 370/538
[58] Field of Search .......................... 370/477, 401–406, 370/911, 395–397, 400, 409, 392, 391, 907, 535, 538, 539

[56] References Cited

U.S. PATENT DOCUMENTS

| | | | |
|---|---|---|---|
| 5,247,516 | 9/1993 | Bernstein | 370/82 |
| 5,493,565 | 2/1996 | Hanson | 370/55 |

OTHER PUBLICATIONS

Lee and Kostas, "Virtual Path (VP)–Based SONET/ATM Ring Architecture", Broadband Aspects of ISDN, GTE Telephone Operations, Dec. 4, 1995.

*Primary Examiner*—Douglas W. Olms
*Assistant Examiner*—David R. Vincent
*Attorney, Agent, or Firm*—Jones & Askew, LLP

[57] ABSTRACT

A method and system for maximization of the use of bandwidth capacity of an optical network when adding a data stream received from a switch to the optical network. In one embodiment, a data stream is added to the optical network. A data stream is received from a switch and grouped into a destination group. The destination group is then sent to the network. In another embodiment, a method for dropping a data stream received from an optical network to a switch is provided. A segment is received from the optical network. If the segment is a private segment, then it is demultiplexed into at least one data stream. The data stream from the private segment is then sent to the switch. In still another embodiment, a method for providing an interface between a switch and an optical network is provided. In this embodiment, a data stream is received from the switch. The data stream is grouped into a destination group and the destination group is sent to the optical network. Also in this embodiment, a private segment is received from the optical network. The private segment is demultiplexed into at least one data stream and the data stream or data streams are sent to the switch. In this embodiment, a public segment is also received. The public segment is demultiplexed into at least one data stream. If the data stream from the public segment is local, the local data stream is sent to the switch. If the data stream is non-local, the non-local data stream is returned to the optical network.

15 Claims, 9 Drawing Sheets

METHOD AND SYSTEM FOR INTERFACING AN ATM SWITCH AND AN OPTICAL NETWORK WHEREIN BANDWIDTH IS MAXIMIZED AND NON-LOCAL DATA STREAMS ARE GROUPED INTO DESTINATION GROUPS

FIELD OF THE INVENTION

The present invention generally relates to communication systems, and more particularly, relates to a method and system for interfacing an ATM switch and an optical network so as to maximize the transfer of information to be transported by the optical network. Even more particularly, the present invention relates to a method and system for the addition of information from an ATM switch to an optical network and for the dropping of information from an optical network to an ATM switch.

BACKGROUND OF THE INVENTION

Next-day air. Delivery in thirty minutes or less. The information superhighway. Our society demands speed, convenience, and efficiency in the delivery of products and services. The communications industry is not exempt from these demands. To be competitive, a provider of communications network services must provide customers with service in a quick, convenient, and efficient manner, and as inexpensively as possible. To remain competitive, such a service provider also must provide customers with new services in a quick, convenient, and efficient manner, and as inexpensively as possible.

Recent advances and improvements in communications technology, such as fiber optic cables and optical networks, provide the communications industry with enormous opportunities to improve existing services and to branch into new services. Thousands of miles of fiber optic cable have been deployed in optical networks. These optical networks make possible the transmission of large amounts of information at great speeds. Optical networks have been used primarily to carry voice signals in telecommunication applications. However, the advanced features of optical networks allow for the transmission of other information such as data, video and multimedia signals. Thus, the communications industry is ideally suited to provide advanced services including the transmission of data, video and multimedia signals.

For example, optical networks may be used to carry the information that provides a subscriber with home entertainment services. Ideally, the subscriber places an order for home delivery of some entertainment such as some music, a video or a movie through the use of a telephone (or other customer premises equipment). The music, video or movie is almost instantaneously delivered over a networked communications system to the subscriber's home entertainment center. The information regarding both order placement and order delivery is carried, at least in part, over optical networks. Thus, the advanced features of optical networks as information transport facilities allow for the provision of new and improved services to subscribers, such as home entertainment services. The advanced features of optical networks provide other opportunities as well. Such opportunities include videoconferencing services, customized services for the provision of special news, sports or entertainment programming as well as other services.

As noted, optical networks provide opportunities for the delivery of new and improved services. However, the cost of these new and improved services to subscribers remains high. The high cost stands as an impediment to the promulgation and acceptance of the new and improved services. One reason for the high cost is an inefficiency in the transport of certain types of information through optical networks. The inefficiency is discussed in further detail below in connection with a brief description of information transport facilities including optical networks.

To deliver information from one point to another, and especially to deliver data, video or multimedia signals from one point to another, service providers have used information transport facilities that include a combination of an asynchronous transfer mode (ATM) system and one or more optical networks. There are drawbacks to the use of this combination as an information transport facility. One drawback is that the transfer of information in an ATM system and an optical network often results in inefficiencies in the transport of the information in the optical network. In other words, an ATM system often transfers information to an optical network in an amount that is much less than the maximum capacity that can be handled by the optical network. This inefficient transfer of information fails to take advantage of the advanced information transmission capabilities of optical networks. This inefficient transfer of information also may actually slow the transmission of information because the inefficient transfers of information take up bandwidth capacity and use up time that could be allocated to more efficient transfers of information.

In addition, the inefficiencies in transport of information through optical networks serve to maintain (rather than to reduce) the generally high cost of use of these networks. By way of explanation, the cost of use of an optical network is approximately the same whatever amount of information is being carried within the bandwidth capacity of the optical network. Inefficient use of the optical network does not allow for much distribution of the cost of use over the different blocks of information transmitted and/or those parties using the optical network. Efficient use of the optical network allows for a greater distribution of the cost of use over the blocks of information transmitted and/or those parties using the optical network. A lower cost for use of the optical network may be achieved by providing that the optical network carries the maximum amount of information and by distributing the cost of the use of the optical network over the maximum amount of information.

To explain the inefficiencies in the transfer of information between an ATM system and an optical network, a basic description of an information transport facility that includes an ATM system and an optical network is provided below.

GENERAL DESCRIPTION OF AN ATM SYSTEM

An ATM system is an information transport facility that is used generally to switch and transport digital information, specifically data, voice and video information, quickly and accurately between or among end users. An ATM system also may be referred to as a broadband/ATM switching system (BSS). ATM systems were selected by the Consultative Committee on International Telephony & Telegraphy (CCITT) (now the International Telecommunications Union (ITU)) in 1988 to realize a broadband integrated services digital network (B-SDN). A broadband integrated services digital network provides such services as videoconferencing, multimedia, and high-definition television (HDTV). Thus, an ATM system may be used to connect multimedia terminals and services, and may be used to establish private communications networks.

An ATM system includes at least one ATM network element and physical links that connect the ATM network element(s) to the customer equipment that is being served by the ATM system. An ATM network element also is referred to as an ATM node or an ATM switch. In particular, an ATM switch is a broad-bandwidth, low delay, high-speed fast packet switch, and may include other functions. The term "ATM switch" is used herein, but it will be understood that the "ATM switch" may include functions other than switching functions, such as multiplexing or demultiplexing functions.

In an ATM system, a block of digital information from a customer is transmitted or relayed between ATM switches in fixed-length units or packets called cells. A cell is said to be "transmitted" over a virtual channel. Those skilled in the art will understand that the term "virtual channel" is a commonly used logical convention used as shorthand to refer to the particular process and manner whereby the cell is routed through the ATM system. Cells destined for the same location are transmitted through the same virtual channel based on a virtual channel identifier common to each cell, as is described in more detail below. Generally, the virtual channel is set up or established by the ATM switch that is the initial recipient of the information. The virtual channel is set up between at least the recipient ATM switch through at least the destination ATM switch. A "virtual channel" is also referred to as a virtual connection or virtual circuit, or may be referred to as a logical channel, logical connection or logical circuit. The term "virtual channel" is used herein. Thus, a plurality of blocks of digital information may be transmitted through an ATM system with each block of digital information comprising a group of cells and with each group of cells destined for the same location being transmitted through the same virtual channel.

From the general discussion of the transmission of information through an ATM system, it will be apparent that virtual channels may share common routing characteristics such that a plurality of virtual channels may be grouped together in a "virtual path" for transmission of the information between ATM switches. The term "virtual path" also is a logical convention used as shorthand to refer to the process and manner whereby a plurality of virtual channels are routed along a common path at least through a portion of an ATM system. In other words, certain virtual channels may be multiplexed into a virtual path. Cells destined for the same general location are transmitted through their own respective virtual channels, but are also transmitted in a virtual path based on a virtual path identifier (VPI) common to each cell, as is described in more detail below. By way of visual explanation, FIG. 1 illustrates the logical convention of grouping of a plurality of virtual channels 1a–1e into a virtual path 2. The logical relationship between a virtual channel and a virtual path is further explained through the use of the following two real-world analogies. (1) To use a telecommunications network analogy, a virtual path may be likened to a trunk group. In this analogy, a virtual channel may be likened to an individual trunk within that trunk group. (2) To use a mailing address analogy, a plurality of virtual channels having a common virtual path may be likened to a plurality of street addresses having a common zip code. The virtual channels are to a common virtual path as a plurality of street addresses are to a common zip code.

As noted above, in an ATM system, a block of digital information is transmitted between ATM switches in fixed-length units called cells. FIG. 2 illustrates the structure of a cell 3 such as may be transported through an ATM system. Each cell contains a five byte header field 4 and a forty-eight byte payload or information field 5. The header field 4 contains: a virtual channel identifier (VCI) 6 in a sixteen bit field; a virtual path identifier (VPI) 7 in an eight bit field; and other information. The virtual channel identifier 6 and virtual path identifier 7 of a cell 3 are used to route the cell pursuant to the appropriate virtual channel and appropriate virtual path to the cell's destination. As terms of logical convention, the virtual channel identifier 6 and virtual path identifier 7 are not source or destination addresses, per se. Rather, the virtual channel identifier 6 and virtual path identifier 7 contain information so that an ATM switch may establish and maintain the appropriate virtual channels and virtual path, and transmit the information accordingly. As noted above, the other field of a cell is the information field 5, which contains the "payload" or information that is being transmitted for the customer from one location to another.

GENERAL DESCRIPTION OF AN OPTICAL NETWORK

An optical network is broadly defined as an information transport facility with fiber optic cables (one or more fibers) serving as the physical link for information transport. Generally, an optical network is a synchronous digital network that conforms to certain standards that define a set of optical interfaces (STS-Ne signals) for network transport. These standards are referred to as SONET (synchronous optical network). SONET defines standard optical signals (STS-Ne signals), a synchronous frame structure for multiplexed digital information traffic, and operations procedures so that optical networks from different manufacturers/carriers may be interconnected.

Information about SONET is set forth in the following recommendations of the CCITT (now the ITU): SONET G.707/708/709. These recommendations are incorporated herein by reference and are available from CCITT, Geneva, Switzerland. Further information on SONET may be obtained from the following standards: ANSI T1.103-1988 American National Standard for Telecommunications: *Digital Hierarchy-Optical Interface Rates and Formats Specifications* and ANSI T1.106-1988 American National Standard for Telecommunications: *Digital Hierarchy-Optical Interface Specifications* (Single Mode).

The data rates and signal level or signal segment designations of the SONET signal hierarchy are provided below in Table 1.

TABLE 1

SONET Signal Hierarchy

| North American Designation | | | |
|---|---|---|---|
| Electrical Signal | Optical Signal | Data Rate (Mbps) | ITU Designation |
| STS-1 | OC-1 | 51.84 | |
| STS-3 | OC-3 | 155.52 | STM-1 |
| STS-9 | OC-9 | 466.56 | STM-3 |
| STS-12 | OC-12 | 622.08 | STM-4 |
| STS-18 | OC-18 | 933.12 | STM-6 |
| STS-24 | OC-24 | 1244.16 | STM-8 |
| STS-36 | OC-36 | 1866.24 | STM-12 |
| STS-48 | OC-48 | 2488.32 | STM-16 |

In an optical network, data is transmitted over an optical carrier at a transport signal of one of the higher STS-Nc signal levels, and use of the STS-12c signal level for data transmission is relatively common. This higher STS-Nc signal level is composed of a multiple number of concatenated lower STS-Nc signal levels. More than one combination of multiple lower STS-Nc signal levels is possible in a higher level signal, and the combination may be dynamically changed over time to accommodate network traffic. The limitation in the combination is that the total of the bandwidth capacity of the lower STS-Nc signals levels in the combination must total the bandwidth capacity of the higher STS-NC signal level. For example, an STS-12c signal level may be composed of one of several different combinations of lower STS-Nc signal levels, such as one of the combinations given below:

(A) STS-12c=twelve STS-1 signal levels;

(B) STS-12c=six STS-1 signal levels and two STS-3c signal levels; or (C) STS-12c=three STS-1 signal levels and three STS-3c signal levels.

FIG. 3A provides further explanation regarding STS-Nc signal levels. In particular, FIG. 3A illustrates a portion 11 of an optical carrier such as may be used as a link in a SONET ring. In particular, portion 11 represents one second of time. For purposes of illustration, let us say that information is being transmitted over this optical carrier at a transport signal of an STS-12c signal level, that is at 155.52 Mbps. In other words, the bandwidth capacity of this portion 11 is 155.52 Mb. FIG. 3A shows that (over portion 11) the STS-12c signal level is composed of six segments 13a–13f, which correspond to six concatenated lower signal levels as follows: STS-1 13a; STS-1 13b; STS-3 13c; STS-1 13d; STS-1 13e; and STS-1 13f. In the logical convention, these segments are referred to as "pipes" for the transport of information. In this example, each of these segments has bandwidth capacity corresponding to its data rate. For example, segment STS-1 13a has a bandwidth capacity of 51.84 Mbps (See Table 1 above). The total bandwidth capacity of this portion 11 is the total bandwidth capacity of all of the segments 13a–13f. Thus, the total bandwidth capacity of segments 13a–13f in portion 11 is equal to the bandwidth capacity of the STS-12c signal level in portion 11.

FIG. 4 illustrates a basic optical network, and in particular, illustrates a basic SONET ring. In this optical network, SONET hubs or nodes 9a–9d are linked by fiber optic connections to form closed loop or a ring. One or more optical carriers may be present in each fiber optic connection to carry the information. Access to and from the SONET ring is available at any of the hubs 9a–9d. Information is added at a particular hub for transport along the SONET ring. Once the information has been added to the SONET ring at a particular hub, the information then is transported around the ring to an appropriate "destination" hub. The information then is dropped from the SONET ring at the "destination" hub onto some other information transport facility for further transmission to the information's ultimate destination.

GENERAL DESCRIPTION OF A COMBINATION OF AN ATM SYSTEM AND AN OPTICAL NETWORK

As noted briefly above, providers of communication network services have used information transport facilities that include a combination of an asynchronous transfer mode (ATM) system and one or more optical networks. An example of such a typical basic combination is illustrated in FIG. 4. In particular, FIG. 4 illustrates a SONET ring optical network 8 with four hubs 9a–9d with the SONET ring connected at one of the hubs 9d to an ATM switch 10. It will be appreciated that a combination ATM/optical network system may be configured differently.

More particularly described, each hub 9a–9d of the SONET ring 8 includes SONET multiplex/demultiplex equipment with additional ring functionality, and preferably includes an add-drop multiplexer (ADM), or another network element such as a digital cross-connect system (DCS) with similar functionality as described below. Each add-drop multiplexer is used to add information to the SONET ring for further transport of the information along the SONET ring. Typically, an add-drop multiplexer merges two or more incoming data information streams into a fewer number of outgoing data streams at a higher rate. For example, an add-drop multiplexer may merge multiple data information streams transmitting at STS-1 or STS-3 signal levels into a data stream transmitting at a STS-12 signal level. To further illustrate the merge process of the add-drop multiplexer, reference is made to Table 2 below:

TABLE 2

| (A) VCI = 001 (64 kbps) S.F. | } | VPI = 101 (64 kbps + 1.5 Mbps) S.F. |
| (B) VCI = 002 (1.5 Mbps) S.F. | | |
| (C) VCI = 003 (75 Mbps) N.Y. | } | VPI = 102 (75 Mbps) N.Y. |

Assume the ATM switch receives three data information streams: (A) Data stream A with cells that include a virtual channel identifier of 001, 64 kbps for a customer's premises in San Francisco; (B) Data stream B with cells that include a virtual channel identifier of 002, 1.5 Mbps for another customer's premises in San Francisco; and (C) Data stream C with cells that include a virtual channel identifier of 003, 75 Mbps in New York. According to the parlance of the logical convention, each of these data streams are referred to as a virtual channel (VC). The ATM switch groups Data streams A and B together based on a virtual path identifier 101 being common to the cells in these data streams. The grouped information is hereinafter referred to as VPI data stream A/B. According to the parlance of the logical convention, such a VPI data stream is referred to as a virtual path (VP). For Data stream C, the virtual path identifier is 102, and this information is hereinafter referred to as VPI data stream C. These VPI data streams are provided to the add-drop multiplexer.

To add the VPI data streams to the optical carrier for transport through the optical network, add-drop multiplexer must add each VPI data stream to a separate segment (lower STS-Nc signal level) of the STS-Nc signal level being operated on the optical carrier. The addition of separate VPI data streams to separate respective segments (lower STS-Nc signal levels) fails to take advantage of the bandwidth capacity of the optical carrier, and the transmission rate of the higher STS-Nc signal level as will be appreciated from the discussion below.

In FIG. 3B, the addition of the VPI data streams to separate segments (lower STS-Nc signal levels) is illustrated in connection with the portion 12 of the optical carrier previously discussed in connection with FIG. 3A. In particular, the add-drop multiplexer may add a VPI data stream only to a segment (lower STS-Nc signal level) that is empty of information and that has sufficient bandwidth capacity to handle the VPI data stream. In the example of FIG. 3B, the "X" over STS-1 segment 13a indicates for the reader that STS-1 segment 13a is not empty, and therefore, the add-drop multiplexer cannot add a VPI data stream to that segment. However, STS-1 segment 13b is empty, and it is of sufficient bandwidth to accommodate VPI data stream A/B because the 64 kbps of VPI data stream A/B are much less than the 51.84 Mbps of STS-1 signal level. So, the add-drop multiplexer adds VPI data stream A/B to STS-1 segment 13b. It will be appreciated that only a minimal amount of the bandwidth capacity of STS-1 segment 13b as representationally indicated by the cross-hatching 13b' has been used by VPI data stream A/B.

To add VPI data stream C, the add-drop multiplexer has limited options. The add-drop multiplexer cannot add VPI data stream C to STS-1 segment 13b in addition to the already added VPI data stream A/B. As noted above, the add-drop multiplexer may add only one VPI data stream per STS-N signal level segment. The next segment, STS-1 segment 13d is empty in our example, but it is of insufficient bandwidth to accommodate the 75 Mbps of VPI data stream C. However, the add-drop multiplexer may add VPI data stream C to segment STS-3C 13e because that segment has sufficient bandwidth capacity. It will also be appreciated that only about half of the amount of the bandwidth capacity of STS-1 segment 13e as representationally indicated by the crosshatching 13e' has been used by VPI data stream C.

To further understand the general operation of the optical network, it will be appreciated that add-drop multiplexer also receives information from other add-drop multiplexers on the SONET ring. The add-drop multiplexer may pass this information to other add-drop multiplexers, or the add-drop multiplexer may drop this information from the SONET ring for further transport of the information on other information transport facilities. Referring to FIG. 4, SONET ring 8 includes add-drop multiplexer 9d which is connected to ATM switch 10. Add-drop multiplexer 9d receives information from ATM switch 10 and adds it to SONET ring 8. Add-drop multiplexer 9d also receives information from other add-drop multiplexers on the SONET ring such as add-drop multiplexer 9a or add-drop multiplexer 9c. The information that add-drop multiplexer 9d receives from the other add-drop multiplexers may be treated as follows: (1) the information may be passed to still other add-drop multiplexers on the SONET ring; or (2) the information may be dropped to the ATM switch 10 for further transport to the information's ultimate destination.

As noted above, one of the drawbacks of a combination of an ATM/optical network system is that information is transferred to an optical network in an amount that is much less than the maximum capacity that can be handled by the optical network. To further explain the inefficiencies in such transfer of information, an example is provided with reference to another kind of transport, public transport—namely, a bus. In this example, the bandwidth capacity of the optical network may be likened to a bus. The access points to the optical network, the add-drop multiplexers, may be likened to bus stops. The information transferred from the ATM system may be likened to passengers waiting at the bus stops. In this example, the cost of operating the bus is the same whether one passenger gets on the bus or whether a lot of people get on the bus. Applying the example to illustrate a drawback of the ATM system/optical network combination, let us say that the ATM system transfers only a limited amount of information to the optical network., i.e., only one passenger is transferred to the bus stop. The bus stops at the bus stop, picks up the passenger and moves on to the next bus stop. However, the cost of transporting this single passenger is very high if the cost of operating the bus is measured in a per passenger manner. In addition, the stop by the bus to pick up the passenger necessarily slows down the bus in its circumvention of the bus route. This slow down may inconvenience other passengers.

As generally explained above, the cost of transporting information in an optical network is based on the optical carrier signal bandwidth that must be dedicated to transport the information rather than the actual bandwidth of the information that is being transported. Industry standards have been set for the various levels of bandwidth capacity in transport mechanisms employed by optical networks. Pursuant to these standards, even for services that require a relatively small amount of bandwidth, an entire lower STS-Nc signal level (pipe) often must be used to transport the information. The bandwidth capacity of an optical network is great, but nevertheless is limited, and is further limited by the necessity of dedicating certain amounts of bandwidth (greater than necessary) to the transport of certain blocks of information. Thus, the cost of using an optical network for the transport of information is high. The high cost leads to the concern that the many SONET rings that are already deployed may not remain cost-effective in an ATM network service environment for transport of new types of multimedia services, especially bursty ATM services.

Thus, there is a need in the art for a method and system that allow for the delivery of new and improved services to subscribers over information transport facilities such as optical networks, that allow for such delivery in a quick, convenient and efficient manner, and that also allow for such delivery as inexpensively as possible. In particular, there is a need in the art for a method and system that are efficient in the transport of certain types of information through information transport facilities. More particularly stated, there is a need in the art for such a method and system that work and interface with existing information transport facilities and network devices. Even more particularly stated, there is a need in the art for such a method and system that transfer information efficiently between an ATM system and an optical network so that the information may be efficiently carried by the optical network. Further, there is a need in the art for such a method and system that avoid the development and administration of new information transport facilities, network devices and that avoid any change in industry standards relating to the transport of information or transmission of signals.

SUMMARY OF THE PRESENT INVENTION

As will be seen, the present invention satisfies the foregoing criteria. Stated generally, the method and system of the present invention provide an interface between a switch and an optical network. Stated more particularly, in one embodiment, the present invention provides a method for maximization of the use of bandwidth capacity of an optical network when adding a data stream received from a switch to the optical network. The data stream is received from the switch. The data stream is grouped into a destination group. The destination group is sent to the optical network. Advantageously, the grouping of data streams into a destination group maximizes the use of bandwidth capacity by loading a single segment (lower STS-Nc signal level) of the optical transport signal with a greater amount of information, thereby avoiding the minimal loading of a plurality of segments. The other segments may be used for the transport of other destination groups. In addition, the designation of the segment carrying the destination group as private avoids a review of the information in the segment except at the intended destination in the optical network.

Another embodiment of the present invention provides a method for determining whether to add a data stream received from a switch to an optical network. In this embodiment, a data stream is received from the switch. The method determines whether the data stream is a local data stream. If the data stream is a local data stream, then the method returns the data stream to the switch. Advantageously, this embodiment avoids the unnecessary processing of information in the optical network.

In still another embodiment, the present invention provides a method for dropping a data stream received from an optical network to a switch. The method receives a segment from the optical network. The method determines whether the segment is a private segment. Preferably, the method determines whether the private segment includes information destined for the switch. If the segment is a private segment, then the private segment is demultiplexed into at least one data stream. Finally, the method sends the data stream or data streams to the switch. Advantageously, this method speeds the transportation of information through the optical network because information associated with a private segment is not reviewed except at the intended destination of the information.

In yet another embodiment, the present invention provides a method for dropping a data stream received from an optical network to a switch. The method receives a segment from the optical network. The segment is demultiplexed into at least one data stream. The method determines whether each data stream is a local data stream and sends the local data stream to the switch. Advantageously, this method directs the transfer of information more efficiently to its intended destination.

Stated even more particularly, an embodiment of the present invention provides a method for providing an interface between a switch and an optical network. The interface is provided by adding a data stream or a non-local data stream to the optical network and by dropping a data stream or a local data stream to the switch. The method starts with the receipt of a data stream from the switch. The method groups the data stream into a destination group and sends the destination group to the optical network. Furthermore, the method receives a private segment from the optical network. In response, the private segment is demultiplexed into at least a first data stream and the first stream is sent to the switch.. The method also receives a public segment from the optical network. In response, the public segment is demultiplexed into at least a second data stream. If the second data stream is a local data stream, then the local data stream is sent to the switch. On the other hand, if the second data stream is a non-local data stream, then the non-local data stream is sent to the optical network.

Advantageously, the present invention provides an interface between a switch and an optical network. In particular, the present invention provides the capability of adding a data stream or a non-local data stream to an optical network and dropping a data stream or a local data stream to a switch. In addition, the present invention provides the described capabilities in a manner that is relatively inexpensive, that does not require changes to existing switches and optical networks, that is easy to use, and that is easy to maintain and service.

Therefore, it is an object of the present invention to provide an improved method and system for interfacing a switch and an optical network.

It is a further object of the present invention to provide a method for adding and dropping information to and from an optical network.

It is also an object to provide a method that does not require any changes to existing switches and optical networks.

Other features and advantages of the present invention will be apparent to persons skilled in the art from the following detailed description of a preferred embodiment accompanied by the attached drawings wherein identical reference numerals will refer to like parts and steps in the various views.

DETAILED DESCRIPTION OF THE PREFERRED EMBODIMENT

Introduction

Generally described, the present invention provides a method and system for an interface between an asynchronous transfer mode (ATM) system and an optical network such that the bandwidth capacity of the optical network is maximized in the transport of information transferred to and from the ATM system. Also generally described, in an embodiment, the present invention provides a method and system for maximization of the use of bandwidth capacity of an optical network when adding a cell received from a switch to the optical network. In this embodiment, a cell is received from a switch, the cell is grouped into a destination group, and the destination group is sent to the optical network. In another embodiment, the present invention provides a method and system for dropping a cell from an optical network to a switch. In this embodiment, a segment of a transport signal is received from an optical network, and a determination is made as to whether the segment is a private segment. If so, then the private segment is demultiplexed into at least one cell, which is sent to the switch. Another embodiment of a method and system for dropping a cell from an optical network to a switch is provided by the present invention. In this embodiment, a segment of a transport signal is received from an optical network, and the segment is demultiplexed into at least one cell. A determination is made whether the cell is a local cell, and if so, then the local cell is sent to the switch. If the cell is a non-local cell, then the non-local cell is sent to the optical network.

Figure 5:
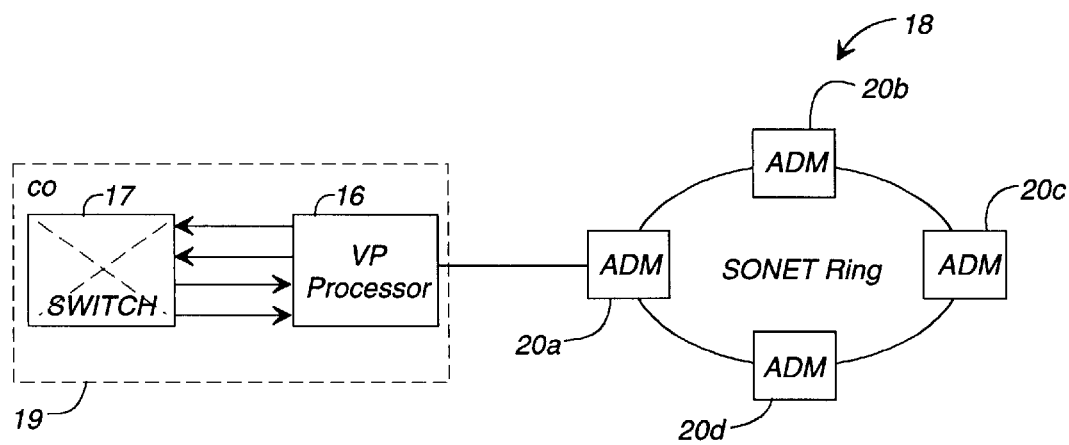
FIG. 5 illustrates the preferred embodiment as implemented by a virtual path processor connected between an ATM system and an optical network.
Figure 6:
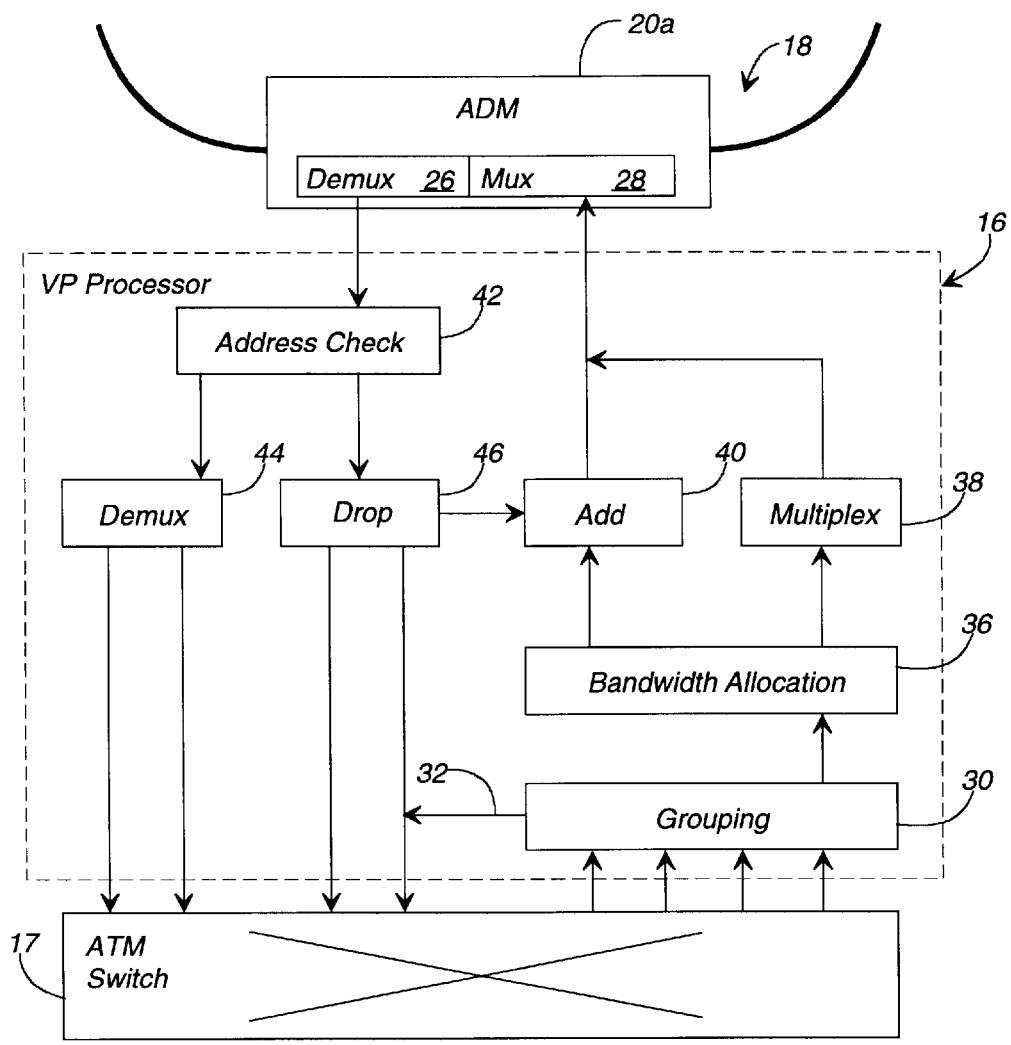
FIG. 6 is a functional block diagram of the preferred virtual path processor.

A more particular description of the present invention is provided in the context of the preferred mode operating in the preferred environment. The preferred mode is implemented through use of a virtual path processor such as illustrated in FIGS. 5–6. In particular, FIG. 5 illustrates a virtual path processor (VPP) 16 connected between an asynchronous transfer mode (ATM) system 17, represented by and hereinafter referred to as ATM switch 17, and an optical network 18. Those skilled in the art will understand that a device of the same functionality as the ATM switch 17 may be used in its place. The virtual path processor 16 preferably is housed with ATM switch 17 in a central office (C.O.) 19 of a telecommunications network. In addition, optical network 18 preferably is a SONET ring including at least one hub comprising an add-drop multiplexer (ADM) or device of equivalent function such as a digital cross-connect system (DCS). The SONET ring 18 illustrated in FIG. 5 includes four hubs 20a–20d comprising add-drop multiplexers (ADMs) at each hub and with add-drop multiplexer 20a being connected to virtual path processor 16. It will be appreciated that ATM switch 17 and optical network 18 are connected to other equipment, network elements, and physical links that are not shown, but are generally present in a communications network.

The virtual path processor 16 preferably facilitates the addition of information to an optical network 18 from an ATM switch 17 so as to maximize the bandwidth capacity of the optical network 18 in the transport of information transferred to and from the ATM switch 17. The terms "addition" or "adding" are used synonymously herein with the term "transfer" in the context of information transfer, except that the terms "addition" or "adding" are used when information is transferred from an ATM switch to an optical network. The virtual path processor 16 also preferably facilitates the dropping of information from an optical network 18 to an ATM switch 17. The terms "drop" or "dropping" are used synonymously herein with the term "transfer" in the context of information transfer, except that the terms "drop" or "dropping" are used when information is transferred from an optical network to an ATM switch.

Referring again to FIG. 5, the virtual path processor 16 preferably facilitates the addition of information to an optical network 18 by receiving information from the ATM switch 17. The information received by the virtual path processor 16 is digital information, and in particular, the virtual path processor 16 receives information in the form of cells from the ATM switch 17. A cell such as is received is defined in the Background of the Invention. Generally stated, the virtual path processor 16 groups each cell into a destination group, and then the virtual path processor 16 sends each destination group to the optical network 18. In an embodiment, the virtual path processor 16 preferably makes a determination as to whether to add a cell received from the ATM switch 17 to the optical network 18. This determination is carried out by checking whether the cell received from the ATM switch is a local cell. If so, then the cell is returned to the switch.

Another feature of the virtual path processor 16 is that it also preferably facilitates the dropping of information from an optical network 18 to an ATM switch 17. One method in which the virtual path processor preferably facilitates such dropping is to receive a segment from the optical network and to determine whether the segment is a private segment. If the signal is a private segment, then the virtual path processor 16 demultiplexers the private segment into at least one cell and sends the cell to the switch. Another method in which the virtual path processor 16 preferably facilitates the dropping of information is to receive a signal from the optical network and to demultiplex the signal into at least one cell. The virtual path processor then determines whether the cell is a local cell, and if so, then the virtual path processor sends the cell to the switch. If the virtual path processor determines that the cell is a non-local cell, then the virtual path processor sends the non-local cell to the optical network.

As a result of the preferred use of the virtual path processor 16, the addition of information to an optical network from an ATM switch is accomplished in a manner that maximizes the bandwidth capacity of the optical network in the transport of information. In particular, the addition of information to the optical network by sending the cells in destination groups to the optical network maximizes the use of the bandwidth capacity of the optical network.

Preferred Operation of the Virtual Path Processor

Additional detail regarding the operation of the preferred mode in the preferred environment is provided with reference to FIG. 6. FIG. 6 is a functional block diagram of the preferred virtual path processor 16 in its connection between an ATM switch 17 and an add-drop multiplexer 20a of SONET ring 18. The blocks illustrated within virtual path processor 16 represent the preferred functions carried out by the virtual path processor in adding information to or dropping information from an optical network. The blocks are arranged in the manner of a flow diagram with directional arrows so that the general sequence of performing the preferred functions will be apparent to those skilled in the art. Further, it should be noted that the virtual path processor's functions associated with the addition of information received from ATM switch 17 to optical network 18 are arranged sequentially from the ATM switch 17 towards the optical network 18 (from bottom to top of FIG. 6) and generally on the right hand side of FIG. 6. The virtual path processor's functions associated with the dropping of information received from the optical network 18 to ATM switch 17 are arranged sequentially from the optical network 18 towards the ATM switch 17 (from top to bottom of FIG. 6) and generally on the left hand side of FIG. 6. Some interaction between the adding and dropping functions preferably takes place as is explained in further detail below. In addition, implementation of the functions performed by the virtual path processor will be apparent to those skilled in the art given the description herein.

ADDITION OF INFORMATION TO THE OPTICAL NETWORK GROUPING OF CELLS

The description of the preferred operation of the virtual path processor 16 in connection with the present invention is described first with respect to the addition of information to the optical network 18. Preferably, the virtual path processor 16 receives information for transfer to the optical network 18 from ATM switch 17 in the form of cells. Referring to block 30, FIG. 6, ("Grouping"), the virtual path processor 16 receives the cells in respective VPI data streams (VPs) and reviews the virtual path identifiers so as to generally obtain routing information or a routing characteristic. This review of the virtual path identifiers reveals whether a VPI data stream is a local VPI data stream or a non-local VPI data stream. A VPI data stream is a local VPI data stream if it is to be routed or transported through the ATM switch 17 that is connected to the virtual path processor 16. In other words, a local VPI data stream does not need to be transferred to the optical network 18, but is to be further routed through the ATM switch 17. If the VPI data stream is a local VPI data stream, then the virtual path processor "returns" the local VPI data stream to the ATM switch 17 as indicated by arrow path 32 in FIG. 6. In an embodiment, the virtual path processor 16 checks whether the VPI data stream is a local VPI data stream by checking the VPI data stream's virtual path identifier for correspondence to the ATM switch 17 connected to the virtual path processor 16. The term "local switch" is used herein to refer to the ATM switch 17 that is connected to the virtual path processor 16. For instance, an ATM switch in Chicago may serve many customers and the address of the Chicago ATM switch may correspond to several virtual path identifiers. Information sent from one of the customers in Chicago to another customer in Chicago may reach block 30 "Grouping". The virtual path processor 16 preferably determines that the VPI data stream is local because the virtual path identifier of the VPI data stream corresponds to the address of the ATM switch. The virtual path processor 16 then returns the VPI data stream to the Chicago ATM switch.

Referring again to block 30 of FIG. 6, as noted immediately above, the virtual path processor 16 preferably reviews the virtual path identifiers of each VPI data stream. The VPI data stream is a non-local VPI data stream (i.e., the VPI data stream is to be transferred to the optical network for further routing) if the virtual path identifier of the VPI data stream does not correspond to the address of ATM switch 17. In the preferred embodiment, a non-local VPI data stream is to be sent over the optical network 18 to a switch that has an address corresponding to the virtual path identifier of the VPI data stream. (Hereinafter, the non-local VPI data stream is referred to as "the VPI data stream" (unless otherwise noted) for purposes of simplicity in explanation). The VPI data stream is reviewed to determine whether the VPI data stream corresponds to a destination group. In the preferred embodiment, the VPI data stream is added into a destination group based on the correspondence of the VPI data stream's virtual path identifier thereto. For instance, a VPI data stream with a virtual path identifier corresponding to a location in Los Angeles is added into a destination group with other VPI data streams that have a common, but not necessarily identical, virtual path identifier. As a further instance, a virtual path identifier having a number between 0 to 100 may identify Los Angeles as the destination for routing the VPI data stream, and a virtual path identifier having a number 101–200 may identify San Francisco as the destination for routing of the VPI data stream.

It should be noted that the virtual path identifier of a VPI data stream in a destination group may not be identical to the virtual path identifier of another VPI data stream in the same destination group. Rather, at this point in the preferred mode of the present invention, the virtual path identifiers of VPI data stream in a destination group have some routing characteristic in common. For example, a group of VPI data stream in a Los Angeles destination group may not have identical virtual path identifiers. However, the virtual path identifier of each VPI data stream in the L.A. destination group has a routing characteristic (such as destination: L.A.) in common with the other virtual path identifiers of the others VPI data streams in the destination group such that the VPI data streams may be transmitted in the same segment.

In an embodiment of the present invention, the review of a VPI data stream may reveal that the VPI data stream fails to correspond to a destination group. The failure may be based on the fact that the virtual path identifier of the VPI data stream does not correspond to any destination group. In that case, a new destination group is preferably created and the VPI data stream is added to this new destination group.

BANDWIDTH ALLOCATION

In the preferred mode, a destination group is not necessarily transmitted to the optical network 18 immediately after the destination group has been formed or a few VPI data streams have been added to the destination group. Rather, the preferred embodiment generally holds a destination group until the sum of the bandwidths of all of the VPI data streams in the destination group is within a private bandwidth range. When the sum of the bandwidths is within the private bandwidth range, the destination group then is preferably sent to optical network 18. Advantageously, holding the destination group until the sum of the bandwidths is within a private bandwidth range provides for the maximization of use of the bandwidth capacity of the optical network 18.

For example, reference again is made to the public transport case discussed in the Background of the Invention. By analogy to the preferred embodiment, a grouping of passengers takes place so that a bus is filled with passengers who have a routing characteristic in common. The passengers on the bus may not all be destined for the same place, but they have at least a certain route in common. Further, the bus does not leave the bus stop, so to speak, until a minimal number of passengers having a common routing characteristic have boarded. Once this minimal number of passengers has boarded, the bus departs the bus stop. In this manner, the cost of operating the bus is distributed over the minimal number of passengers, thereby lowering the cost of travel for each passenger.

With respect to block 36, "Bandwidth Allocation", in FIG. 6, the process of determining the bandwidth size of a destination group and allocating a destination group to a particular segment of a transport signal based on bandwidth capacity is generally described below. This bandwidth allocation process preferably follows after the grouping process described above in connection with block 30. In bandwidth allocation, a bandwidth size is determined for each destination group. The bandwidth size of a destination group is equal to the sum of the bandwidths of the VPI data streams in the destination group. The bandwidth size is then compared to a first private bandwidth range. The first private bandwidth range is selectably set by the service provider. In particular, the first private bandwidth range is preferably set to represent a range of bandwidths that is sufficiently close to the bandwidth capacity of the lowest STS-Nc signal level (or segment) of the transport signal of the optical network 18. Setting the first private bandwidth range close to the bandwidth capacity of the lowest STS-Nc signal level efficiently utilizes the bandwidth of that segment of the transport signal. This efficient utilization results from the process of "assigning" or "allocating" a particular destination group with a bandwidth size that falls within the private bandwidth range to a segment of the transport signal corresponding to the private bandwidth range. For example, the optical network 18 is preferably a SONET ring with low STS-Nc signal levels such as STS-1 and STS-3c. Thus, the segment of the transport signal with the lowest bandwidth is STS-1 with a bandwidth capacity of about fifty Mbps. The service provider may set the first private bandwidth range between thirty-five Mbps and fifty Mbps to try to make sure that at least seventy percent of the bandwidth capacity of the STS-1 segment is filled. When a destination group with bandwidth size of forty-five Mbps is assigned to an STS-1 segment of the transport signal, the bandwidth capacity of that segment is very nearly maximized.

If the bandwidth size is within the first private bandwidth range, then the preferred method and system of efficiently adding the cells in the destination group to the optical network 18 continues as is described below in connection with block 38 "Multiplex". In particular, the destination group is preferably multiplexed into a signal and the signal is sent to the optical network 18 as is described in further detail below.

Referring still to the bandwidth allocation process, block 36, FIG. 6, if the bandwidth size of a destination group is greater than the first private bandwidth range, the virtual path processor 16 preferably determines whether the destination group is within a second private bandwidth range. The second private bandwidth range is selectably set by the service provider. In particular, the second private bandwidth range is preferably set to represent a range of bandwidths that is sufficiently close to the bandwidth capacity of a second segment (low STS-Nc signal level) of the transport signal of the optical network 18. Setting the second private bandwidth range close to the bandwidth capacity of the second segment (low STS-Nc signal level) of the transport signal efficiently utilizes the bandwidth of that transport signal. This efficient utilization results from the process of "assigning" or "allocating" a particular destination group with a bandwidth size that falls within this second private bandwidth range to the second segment (low STS-Nc signal level) of the transport signal corresponding to the second private bandwidth range. For instance, in the preferred embodiment, the optical network 18 is a SONET ring with STS-1 and STS-3c signal levels. The service provider may set the second bandwidth range between the bandwidth capacity of STS-1 and the bandwidth capacity of STS-3c, that is, between fifty Mbps and 150 Mbps. In that case, a destination group with a bandwidth size between fifty Mbps and 150 Mbps is sent over the STS-3c transport signal. Therefore, the bandwidth capacity of the second segment is efficiently used to transport a destination group with a bandwidth size too large to be transported by the first segment.

If the bandwidth size of the destination group is within the second private bandwidth range, then the preferred method and system continues as is described below in connection with block 38 "Multiplex". In particular, the destination group is preferably multiplexed into a signal and the signal is sent to the optical network 18. Otherwise, the bandwidth size of the destination group may be compared to yet another third private bandwidth range. As those skilled in the art will understand, the iterations of the review of a destination group's bandwidth size and whether the destination group's bandwidth size falls within a private bandwidth range, may continue until the destination group's bandwidth size either falls within a private bandwidth range, or has been compared to the private bandwidth range of the segment (STS-Nc signal level) of the transport signal of the optical network 18 with the largest bandwidth capacity. The iterations of the review of a destination group's bandwidth size, and whether any particular destination group's bandwidth size falls within a private bandwidth range are limited by the number, capacity and type of segments (STS-Nc signal levels) of the transport signals used in the optical network. As those skilled in the art will understand, if the bandwidth size of the destination group is greater than the private bandwidth range of the segment with the largest bandwidth capacity, then the destination group is rejected.

If the bandwidth size of a destination group is less than the first private bandwidth range, then the preferred method and system of efficiently adding the VPI data streams in the destination group to the optical network 18 continues as is described below in connection with block 40 "Add". In particular, if the bandwidth size of a destination group is less than a first private bandwidth range, then the destination group is sent to a holding point as is described in further detail below. In certain cases, a destination group may have a bandwidth size that is greater than the first private bandwidth range, but have a bandwidth size that falls on the low end of a second or other private bandwidth range. Alternatively, a destination group may have a bandwidth size that does not "fit" optimally within a private bandwidth range, separately or in combination with other destination groups. In these cases, the preferred mode is to send the subject destination group to a holding point as is described in connection with block 40 below.

MULTIPLEX

In the present invention, the information received from the ATM switch 17 is transferred to the optical network 18 in a manner so as to maximize the bandwidth capacity of that optical network. The preferred mode implements that goal by multiplexing the information in the destination groups and then sending the multiplexed information to the add-drop multiplexer 20a of the optical network 18. The process of multiplexing the information preferably follows after the bandwidth allocation process generally described in connection with block 36. The process of multiplexing is described generally in connection with block 38 of FIG. 6.

In particular, after comparing the bandwidth size of a destination group to the private bandwidth ranges, a private segment identification (segment ID) is assigned to the destination group if the bandwidth size of the destination group is within a private bandwidth range. On the other hand, if the bandwidth size of a destination group is less than the first private bandwidth range, a public segment identification is "carried over" with non-local data streams from the drop process and assigned to the data streams in a destination group when the data streams are added to non-local data streams from the drop process. A segment ID identifies a particular segment (STS-Nc signal level) of the transport signal. In addition, a segment ID may be either a public segment ID or a private segment ID. A public segment ID identifies a segment as "public" in that a public segment carries blocks of information with the blocks of information destined respectively for one or more destinations. Thus, each add-drop multiplexer on a SONET ring reads the information in a public segment to determine whether any information is to be dropped to the ADM's associated ATM switch. On the other hand, a private segment ID identifies a segment as "private" in that a private segment carries information that is destined for one destination. If an add-drop multiplexer notes that a segment is private, then the add-drop multiplexer does not read the information and the information is passed on to the next add-drop multiplexer until it reaches its destination. Since information in a private segment is not reviewed by every add-drop multiplexer on the SONET ring, the information is transported through the optical network more quickly than information carried in a public segment.

Referring again to block 38, "Multiplex", preferably the destination groups to this block are only assigned a private segment ID. In the preferred embodiment, a public segment ID is assigned to a destination group when the destination group includes information that must be distributed amongst two or more ATM switches or nodes. Further information regarding the assignment of a public segment ID to a destination group is provided below in connection with the dropping of information from an optical network, and in particular, in connection with the discussion relating to "Drop" block 46 of FIG. 6. A private segment ID is preferably assigned to a destination group when the destination group includes information that is to be routed to only a single destination. A private segment is routed to a single destination, and therefore, the private segment Still referring to "Multiplex" block 38, FIG. 6, after a destination group has been assigned a segment ID, then the VPI data streams in a destination group are preferably multiplexed into a signal. In the preferred embodiment, the VPI data streams in the destination group are multiplexed into an STS-N segment of a transport signal of a SONET ring. Multiplexing is well-known method in the art for concentrating lower rate signals into a higher rate signal. A service multiplexer, statistical multiplexer or other similar multiplexing system can be used to perform the multiplexing in the preferred method as will be appreciated by those skilled in the art.

More particularly described, the VPI data streams in a destination group are preferably multiplexed into the STS-N transport signal that was assigned or allocated during the bandwidth allocation process such as was described above in connection with block 36, FIG. 6. For example, as noted in the above discussion, a destination group with bandwidth size of forty-five Mbps is assigned or allocated to an STS-1 transport signal so as to maximize the use of the bandwidth capacity of that transport signal. Thus, this destination group with forty-five Mbps of bandwidth is multiplexed into an STS-1 transport signal.

After the destination group is multiplexed into a signal, then the signal is preferably sent from the virtual path processor 16 to the optical network 18. In particular, in the preferred embodiment, the signal is received by a multiplexer 28 of the add-drop multiplexer 20a of SONET ring 18. The VPI data streams in this destination group that have been multiplexed into a signal have been added to the optical network 18, and further, have been added in a manner to maximize the use of the bandwidth capacity of the optical network.

To more fully illustrate the advantages of the present invention, another example is provided. Reference is made to Table 3 below:

TABLE 3

| | |
|---|---|
| (A) VPI = 101 (10 Mbps) L.A. | |
| (B) VPI = 102 (35 Mbps) S.F. | } Destination Group |
| (C) VPI = 103 (1.5 Mbps) S.D. | |

Figure 1:
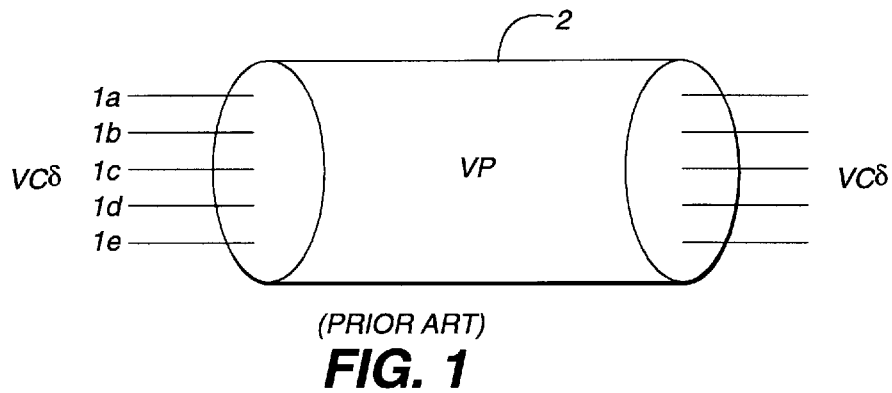
FIG. 1 illustrates the grouping of a plurality of virtual channels in a virtual path.
Figure 2:
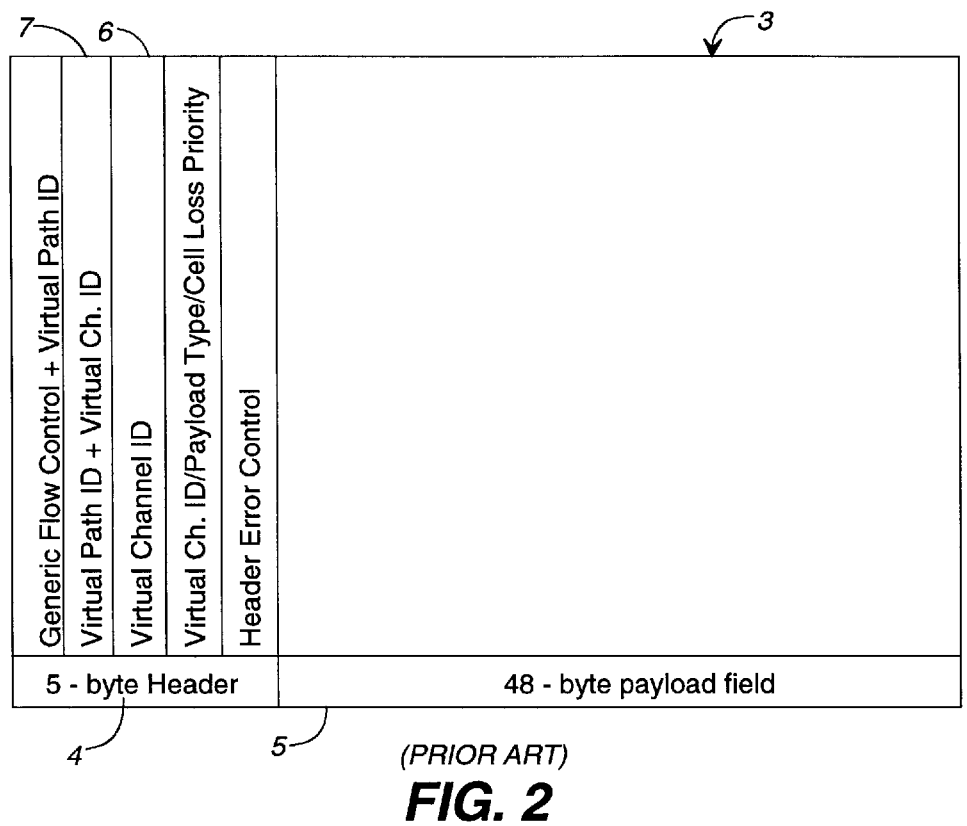
FIG. 2 illustrates the structure of a cell transported through an ATM system.
Figure 3A:
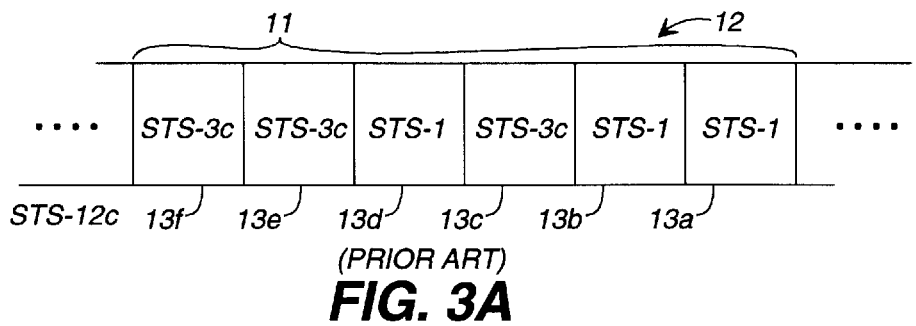
FIGS. 3A–3D illustrate a representative portion of an optical carrier such as may be used in a SONET ring.
Figure 3B:
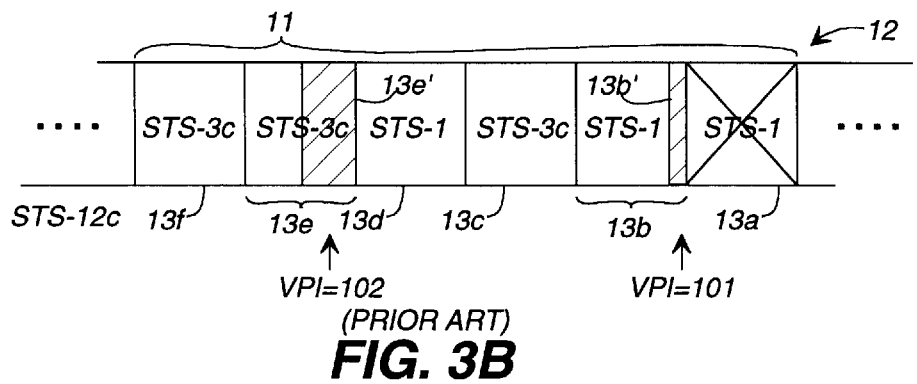
Figure 3C:
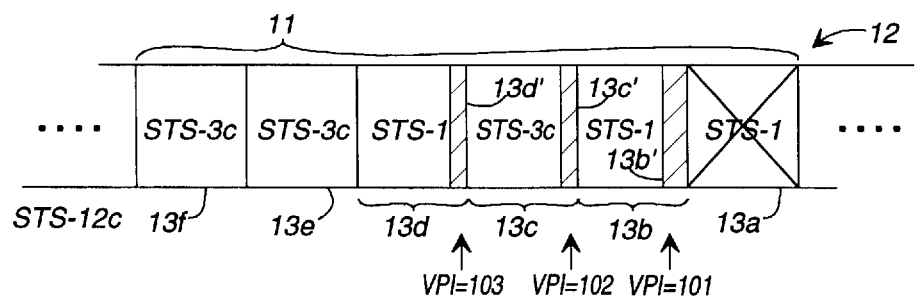

For purposes of this example, assume virtual path processor 16 has received three VPI data streams: (A) VPI data stream A with VPI identifier of 101 and 10 Mbps for Los Angeles; (B) VPI data stream B with VPI identifier 102 and 35 Mbps for San Francisco; and (C) VPI data stream with VPI identifier and 1.5 Mbps for South Dakota. Pursuant to the prior art interface between an ATM switch and an optical network, these VPI data streams would have been inefficiently added to a transport signal. The reader is referred to FIG. 3C to illustrate this inefficiency. FIG. 3C illustrates the segments (lower STS-Nc signal levels) of the transport signal of the optical carrier discussed in connection with FIGS. 3B and 3A. Pursuant to the prior system, the add-drop multiplexer of the SONET ring would add each of the three VPI data streams noted in Table 3 to a different segment of the transport signal. Referring to FIG. 3C, the "X" over STS-1 segment 13a indicates for the reader that STS-1 segment 13a is not empty, and therefore, the add-drop multiplexer cannot add a VPI data stream to that segment. However, STS-1 segment 13b is empty, and it is of sufficient bandwidth to accommodate VPI data stream A because the 10 Mbps of VPI data stream A are much less than the 51.84 Mbps of STS-1 signal level. So, the add-drop multiplexer adds VPI data stream A to STS-1 segment 13b. It will be appreciated that only a minimal amount of the bandwidth capacity of STS-1 segment 13b as representationally indicated by the cross-hatching 13b' has been used by VPI data stream A. To add VPI data stream B, the add-drop multiplexer notes that STS-3 segment 13c is empty, and it is of sufficient bandwidth to accommodate VPI data stream B because the 35 Mbps of VPI data stream A are much less than the 155.52 Mbps of STS-3 signal level. So, the add-drop multiplexer adds VPI data stream B to STS-3 segment 13c. It will be appreciated that only a very minimal amount of the bandwidth capacity of STS-3 segment 13c as representationally indicated by the cross-hatching 13c' has been used by VPI data stream B. To add VPI data stream C, the add-drop multiplexer notes that STS-1 segment 13d is empty, and it is of sufficient bandwidth to accommodate VPI data stream C because the 1.5 Mbps of VPI data stream C are much less than the 51.84 Mbps of STS-1 signal level. So, the add-drop multiplexer adds VPI data stream C to STS-1 segment 13d. It will be appreciated that only a minimal amount of the bandwidth capacity of STS-1 segment 13d as representationally indicated by the cross-hatching 13d' has been used by VPI data stream B. The addition of separate VPI data streams to separate respective segments (lower STS-Nc signal levels) fails to take advantage of the bandwidth capacity of the optical carrier, and the transmission rate of the higher STS-Nc signal level as will be appreciated from the discussion below.

Figure 3D:
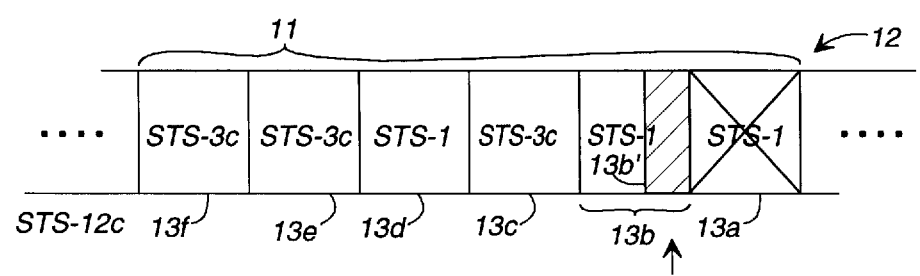
Figure 4:
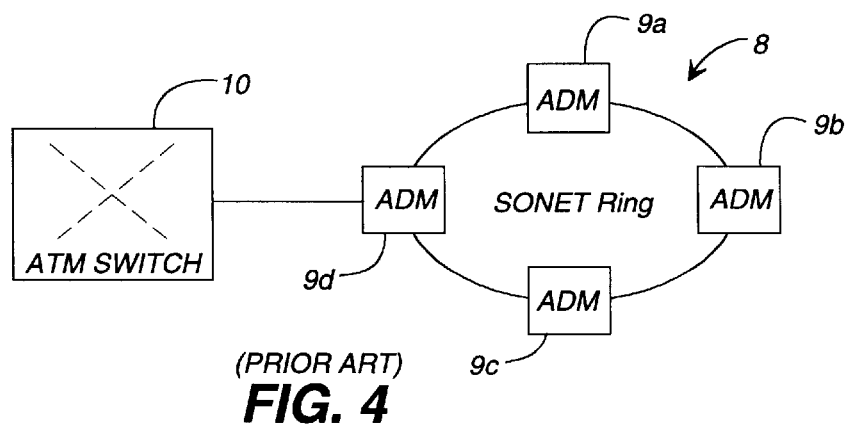
FIG. 4 illustrates a SONET ring optical network connected to an ATM system.

The present invention takes advantage of the bandwidth capacity of the optical carrier. To illustrate, reference again is made to Table 3 and yet another illustration (FIG. 3D) of the segments (lower STS-Nc signal levels) of the transport signal of the optical carrier discussed in connection with FIGS. 3A, 3B and 3C. Pursuant to the present invention, the virtual path processor 16 preferably groups the three VPI data streams A, B and C into a single destination group on the basis of some common routing characteristic such as the common general destination of California. The bandwidth size (46.5 Mbps) of this destination group is reviewed and compared to a first private bandwidth range. The bandwidth size (46.5 Mbps) of this destination group is found to fall within the first private bandwidth range in that the bandwidth size of this destination group is optimal for transport in a STS-1 signal level segment. A private segment ID corresponding to the STS-1 signal level segment is assigned, the VPI data streams are multiplexed into the destination group, and the destination group is sent to the add-drop multiplexer of the SONET ring. The add-drop multiplexer adds the destination group to the optical carrier by mapping the destination group into STS-1 signal level segment 13b. As before, STS-1 signal level segment 13a is unavailable. So, the add-drop multiplexer adds the destination group to STS-1 segment 13b.

It will be appreciated that approximately half of the bandwidth capacity of STS-1 segment 13b as representationally indicated by the cross-hatching 13b' has been used by the destination group. The addition of the destination group comprising the three separate VPI data streams A, B and C to a single STS-1 signal level 13b takes greater advantage of the bandwidth capacity of the optical network and the transmission rate of the higher STS-Nc signal than did the addition of the three separate VPI data streams into separate respective segments (lower STS-Nc signal levels). Further, the addition of all three VPI data streams into a single STS-1 signal level frees up two other segments (lower STS-Nc signal levels) for the transport of other destination groups. In addition, the designation of the STS-1 signal level segment 13b as a private segment results in the quicker transport of the information in the destination group through the optical network. Other advantages will become apparent to those skilled in the art.

DROPPING OF INFORMATION FROM THE OPTICAL NETWORK

The description of the preferred operation of the virtual path processor 16 in connection with the present invention is described below with respect to the dropping of information from the optical network 18 to the ATM switch 17. Information is said to be "dropped" from an optical network when the information is transferred from the optical network to some other information transport facility such as an ATM system. Referring to FIG. 6, information that is to be routed from optical network 18 to and through ATM system represented by the ATM switch 17 is "dropped" from the optical network to the ATM system. Preferably, the virtual path processor 16 receives information for transfer from the demultiplexer 26 of the add-drop multiplexer 20a of SONET ring 18. This information is received in the form of segments. For purposes of simplicity in explanation, the preferred mode of operation is generally described with reference to a singular "segment", but those skilled in the art will understand that the description applies to the plural "segments", unless noted.

ADDRESS CHECK

In the preferred embodiment, the virtual path processor 16 receives a segment from the optical network 18. As a first step in processing this segment, the virtual path processor preferably conducts an address check as is described in connection with block 42 of FIG. 6. In the address check, the virtual path processor 16 preferably determines whether the segment is a public segment or a private segment. The virtual path processor determines whether a segment is public or private by reviewing the segment identification (segment ID) of the segment, or some other indicator of the segment.

As noted above in the "Multiplex" section with respect to the assignment of a segment ID (block 38, FIG. 6), a private segment includes information that is to be routed to only a single destination. Generally, the only private segments the virtual path processor 16 receives are private segments that are to be routed through the connected (local) ATM switch 17, where the ATM switch 17 is considered the single destination for routing purposes. It will be apparent to those skilled in the art that ATM switch 17 may not be the ultimate destination. Information that is erroneously received from the optical network 18 is returned thereto, or discarded.

After a segment has been determined in the address check to be a private segment, then the private segment preferably is demultiplexed into at least one data stream as is described below in connection with block 44, FIG. 6.

Also as noted above in the "Multiplex" section with respect to the assignment of a segment ID (block 38, FIG. 6), a public segment generally includes information (data streams or data streams in destination groups) that must be distributed amongst two or more ATM switches or nodes. For example, a public segment may include information that is to be dropped to ATM switch 17 (the local switch) and it may include information that is to be routed further along the optical network to another or other ATM switches that are connected to the optical network.

After a segment has been determined in the address check to be a public segment, then the public segment preferably is processed in accordance with a drop process as described below in connection with block 46, FIG. 6.

DEMUX

As noted above in connection with the address check discussion associated with block 42, FIG. 6, if a segment is determined to be a private segment, then the private segment is preferably demultiplexed as is described in connection with block 44. In the preferred embodiment, the virtual path processor 16 demultiplexers the private segment into at least one data stream. After demultiplexing the private segment into a data stream or data streams, the virtual path processor 16 preferably sends the data streams to ATM switch 17. These data streams are all demultiplexed from a private segment, and thus, ATM switch 17 is the destination of these data streams, at least with respect to routing of this information through the combined ATM system/optical network.

Thus, it will be apparent to those skilled in the art that the private segment is demultiplexed into a data stream or data streams and does not need to be reviewed by the virtual path processor to determine whether the data stream or data streams are local or non-local. All of the data streams in a private segment that are received by the virtual path processor correspond to the address of the ATM switch. Thus, the process of determining whether a data stream is local or non-local, such as described below for public segments, is unnecessary for data streams of a private segment.

DROP

As noted above in connection with the address check discussion associated with block 42, FIG. 6, if a segment is determined to be a public segment, then the public segment is preferably demultiplexed as is described in connection with drop process, block 46, FIG. 6. In this drop process, in the preferred embodiment, the public segment is demultiplexed into at least one data stream or data streams. The virtual path processor 16 then preferably determines whether a data stream is a local data stream or a non-local data stream. A data stream is a local data stream if it is to be routed to or transported through the ATM switch 17 that is connected to the virtual path processor 16. In other words, a local data stream does not need to be returned to the optical network 18, but is to be further routed through the ATM switch 17. In an embodiment, the virtual path processor 16 preferably checks whether the data stream is a local data stream or a non-local data stream by checking the data stream's virtual path identifier for correspondence (or lack thereof) to the ATM switch 17 connected to the virtual path processor 16. The virtual path processor 16 then preferably sends a local data stream to ATM switch 17.

A data stream is a non-local data stream (i.e., the data stream is to be transferred to the optical network for further routing) if the virtual path identifier of the data stream does not correspond to the address of ATM switch 17. In the preferred embodiment, a non-local data stream is to be sent over the optical network 18 to a switch that has an address or otherwise corresponds to the virtual path identifier of the data stream. The virtual path processor 16 returns non-local data streams to the optical network 18 through block 40 "Add", FIG. 6 with farther detail described below. Preferably, the non-local data streams that are to be returned each retain the segment identification (segment ID) of the public segment with which each data stream was respectively associated when the data stream was received from the optical network 18 by the virtual path processor 16.

ADD

In the above described bandwidth allocation process, block 36, FIG. 6, it was noted that if the bandwidth size of a destination group is less than the first private bandwidth range, then the destination group is sent to a holding point. In the preferred embodiment, this holding point is part of the add process described in connection with block 40, FIG. 6. A destination group is preferably held in the holding point until additional information (bandwidth, data streams) is received by the add process such that the information of the destination group may be combined with other information so as to constitute an amount of information (bandwidth) that may be transferred to the optical network in an efficient manner and so as to maximize the use of the capacity of the bandwidth of the optical network.

In the preferred embodiment, the virtual path processor 16 receives the non-local data streams from the drop process as described in connection with block 46, FIG. 6. These non-local data streams are to be returned to the optical network. As noted, these non-local data streams preferably retain their respective public segment identification. The virtual path processor 16 preferably determines whether there is any available bandwidth capacity on the public segment from block 42, FIG. 6, "Drop". Preferably, the bandwidths of the non-local data streams from block 42 are added together and compared to the bandwidth capacity of the public segment to determine whether there is any available bandwidth capacity. For instance, a public segment, such as an STS-1, may contain local data streams with a bandwidth of ten Mbps and non-local data streams with a bandwidth of twenty Mbps. An STS-1 public segment has about fifty Mbps of bandwidth capacity. Thus, at block 42, the local data streams with ten Mbps of bandwidth are sent to the local switch and the non-local data streams of twenty Mbps of bandwidth are sent to block 40, "Add". Thus, at block 40, the bandwidth of the non-local data streams are added and compared to the bandwidth capacity of the public segment. In this instance, the available bandwidth capacity would be thirty Mbps. If there is available bandwidth capacity, then the virtual path processor 16 adds the data streams received from the bandwidth allocation process to the non-local data streams from the drop process.

Once the data streams of the destination groups are added to the non-local data streams from the drop process, then the data streams that have been added together are multiplexed into a public segment. As mentioned above, the public segment ID is carried over from block 42, "Drop". This segment is a public segment because the segment includes information that must be distributed amongst two or more ATM switches or nodes.

If bandwidth capacity is unavailable to combine data streams from the bandwidth allocation process with other data streams from the drop process, then these data streams from bandwidth allocation and any other non-combined data streams are preferably held in a holding point such as a buffer. This information is held until bandwidth capacity of a public segment from block 42, "Drop", becomes available. In an embodiment of the preferred mode, information is held at the holding point for a selectably limited time before being transferred to the optical network 18. In this manner, the holding of the information does not delay processing of the information. The description above in reference to FIG. 6 outlined the overall functioning of the preferred method and system of the present invention as implemented by the virtual path processor. A flowchart description of the preferred method and system of the present invention is given below in reference to FIGS. 7–11.

Flowchart Description of the Preferred Method and System

The flow diagrams in FIGS. 7–11 provide a detailed description of the preferred process steps executed by the corresponding processing circuitry of the virtual path processor. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a mere mechanical step for a person skilled in the programming art.

FIG. 7

Figure 7:
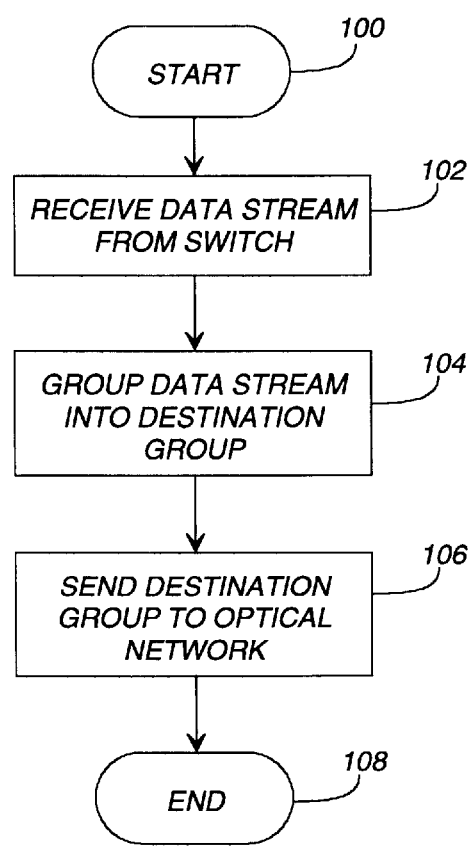
FIG. 7 is a flow chart of the preferred method of adding a cell to an optical network.

Referring now to FIG. 7, a general flowchart of the preferred method of adding data streams to the optical network is shown. At step 100, the method starts. Data streams are received from an ATM switch at step 102. The data streams are grouped into a destination group at step 104. As explained above, the data streams are preferably grouped together based on the destination of each data stream so that each destination group contains data streams that are to be routed to the same destination or destinations. For example, a system implementing the preferred method in Atlanta may receive four data streams from a switch: Data stream A with a virtual path identifier corresponding to Chicago; Data stream B with a virtual path identifier corresponding to New York; Data stream C with a virtual path identifier corresponding to Chicago; and Data stream D with a virtual path identifier corresponding to Cleveland. The exemplary system groups these four data streams into three destination groups: (1) a destination group to Chicago containing Data stream A and Data stream C; (2) a destination group to New York containing Data stream B; and (3) a destination group to Cleveland containing Data stream D. A detailed description of the preferred method of grouping the data streams is described below in connection with FIG. 8.

Still referring to the flowchart of FIG. 7, a destination group is sent to the optical network at step 106. At step 108, the method ends. Advantageously, the method and system of the present invention transfer data streams from an ATM system to an optical network in an efficient and accurate manner and so as to maximize the bandwidth capacity of the optical network.

FIG. 8

Figure 8:
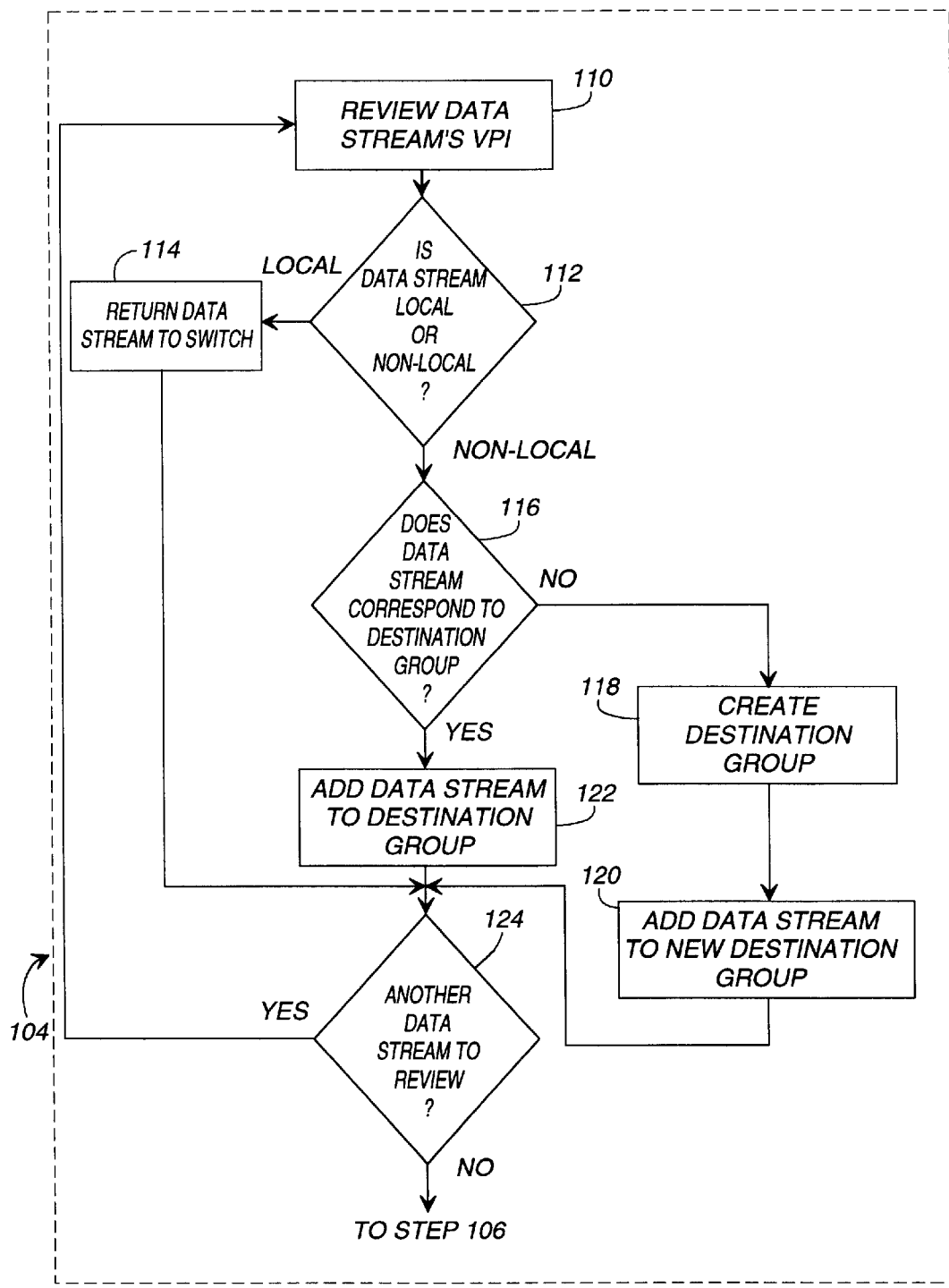
FIG. 8 is a flow chart of the preferred method of grouping cells into a destination group.

FIG. 8 is a flowchart including more detailed and preferred steps corresponding to the grouping step 104 of FIG. 7. To group a data stream into a destination group, the virtual path identifier of the data stream is reviewed at step 110. At decision step 112, a determination is made whether the data stream is a local data stream or a non-local data stream. For example, a businesswoman in Atlanta is conducting a videoconference with a client named Mr. Ning Chang in Seattle. The businesswoman wishes to send a video of herself to the Mr. Ning Chang in Seattle. The businesswoman also wishes to view the video of herself so that she is able to know exactly what her client is seeing. Thus, at step 112, the system that implements the preferred method in Atlanta determines whether the data streams of the videoconference are local or non-local. The data streams of the videoconference shown to the businesswoman in Atlanta are local because the virtual path identifier of the data streams corresponds to the address of the ATM switch in Atlanta. The data streams of the videoconference shown to Mr. Ning Chang in Seattle are non-local because the virtual path identifier of the data streams corresponds to the address of an ATM switch in Seattle.

Referring again to FIG. 8, if the determination in step 112 is that the data stream is local, then the data stream is returned to the local switch at step 114. If the data stream is a non-local data stream, a determination is made in step 116 whether or not the data stream corresponds to a destination group. As explained above, a destination group includes a set of data streams with a common routing characteristic such as a common destination.

If the data stream does not correspond to a destination group, then a destination group is created for the data stream at step 118. Preferably, a destination group address corresponding to the virtual path identifier of the data stream is also created and added to the set of destination group addresses at step 118. The data stream is then added to the new destination group at step 120. In step 124, the preferred mode checks whether there is another data stream to review, and if not, then the method ends in step 106. If there is another data stream to review, the preferred mode returns to step 110 to repeat the data stream grouping process.

Referring again to step 116 wherein a determination is made as to whether the data stream corresponds to a destination group, if the determination is positive, then the data stream is preferably added to the destination group at step 122. In step 124, the preferred mode checks whether there is another data stream to review, and if not, then the method ends in step 106. If there is another data stream to review, the preferred mode returns to step 110 to repeat the data stream grouping process.

The above-described preferred method of grouping data streams as described in FIG. 8 can be better understood in terms of an example, such as described below.

EXAMPLE FOR FIG. 8

An ATM switch in Atlanta sends four data streams (Data Streams A, B, C, and D) to a system that implements the preferred method of grouping data streams described in FIG. 8. Data Stream A has a virtual path identifier corresponding to a destination of Atlanta; Data Stream B has a virtual path identifier corresponding to a destination of Seattle; Data Stream C has a virtual path identifier corresponding to a destination of New York; and Data Stream D has a virtual path identifier corresponding to a destination of Seattle. The preferred system reviews the virtual path identifier of Data Stream A, and it is determined that Data Stream A is local. Data Stream A is local because the virtual path identifier of Data Stream A corresponds to the address of the ATM switch 17 in Atlanta. Data Stream A is returned to the ATM switch in Atlanta. The system further determines that there is another data stream to review since Data Streams B, C, and D have not been reviewed.

Continuing the example, the virtual path identifier of Data Stream B is reviewed next, and it is found to be non-local because Data Stream B has a virtual path identifier corresponding to a destination of Seattle. In addition, it is determined that Data Stream B does not correspond to a destination group. In this example, no destination groups have been created. A destination group for Data Stream B is created with a destination group address corresponding to the virtual path identifier of Data Stream B. Data Stream B is added to the destination group. The system further determines that there is another data stream to review.

Data Stream C is the next data stream to be reviewed. The virtual path identifier of Data Stream C is reviewed, and Data Stream C is found to be non-local. It is determined that no destination group exists for Data Stream C. The only existing destination group is the destination group with a destination group address corresponding to a destination of Seattle. A destination group for Data Stream C is created with a destination group address corresponding to the virtual path identifier of Data Stream C, and Data Stream C is added to the destination group. The system further determines that there is another data stream to review.

Data Stream D is the next data stream to be reviewed. The virtual path identifier of Data Stream D is reviewed, Data Stream D is found to be non-local, and it is determined that Data Stream D corresponds to a destination group. Data Stream D is added to the destination group that includes Data Stream B. The system further determines that there is no other data stream to review. After this grouping of the data streams, the destination groups (one including Data Streams B and D to Seattle, and another including Data Stream C to New York) are sent ultimately to the optical network 18.

FIG. 9

Figure 9:
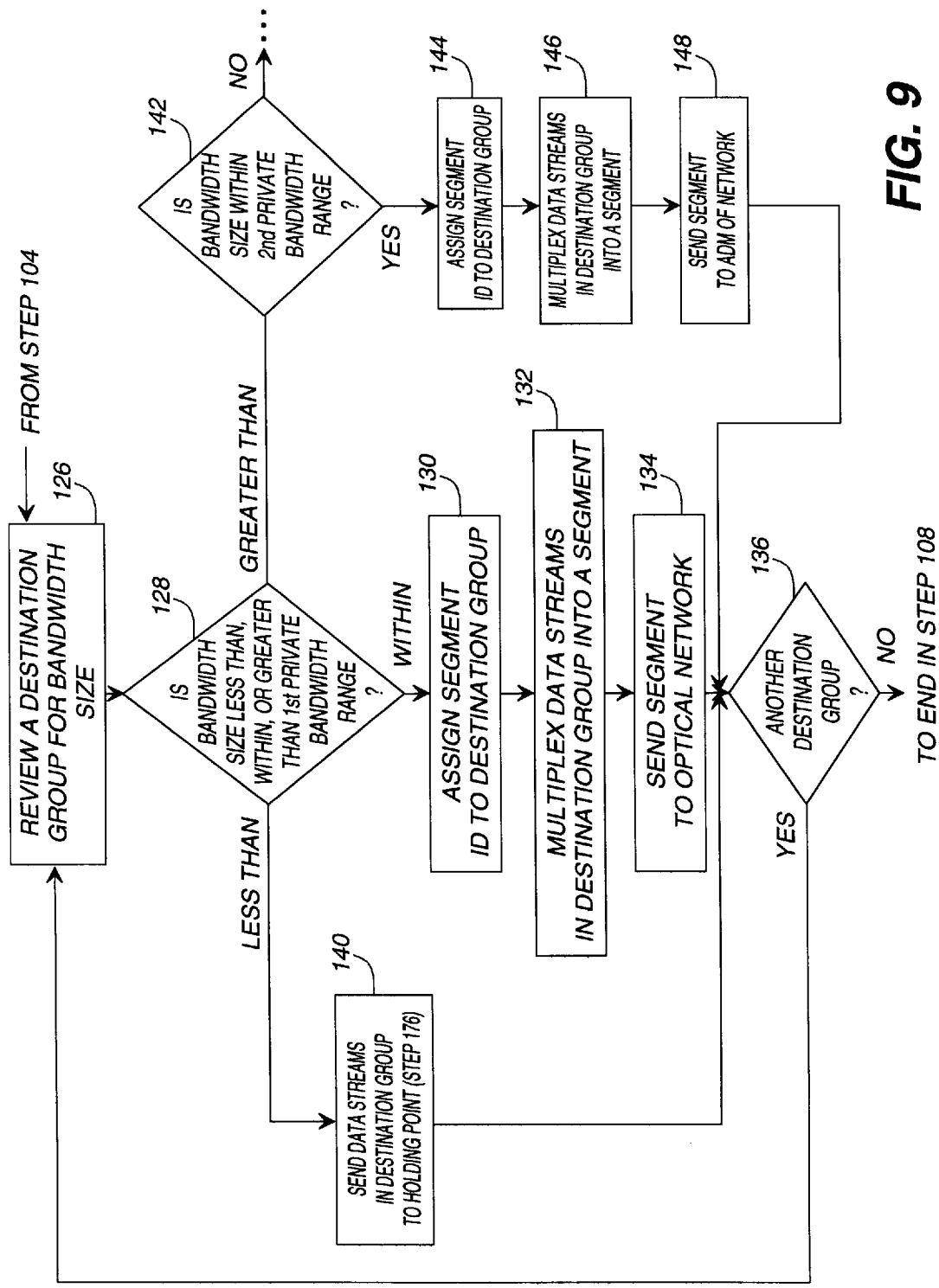
FIG. 9 is a flow chart of the preferred method of sending a destination group to the optical network.

FIG. 9 is a flowchart including more detailed preferred steps corresponding to the sending step 106 of FIG. 7. Referring to FIG. 9, a destination group is reviewed at step 126 to determine a bandwidth size for the destination group. The bandwidth size for a destination group is the sum of the bandwidths of all of the data streams in a destination group. For example, a sample destination group contains Data Stream A with a bandwidth of ten Mbps, Data Stream B with a bandwidth of five Mbps, and Data Stream C with a bandwidth of one and one-half Mbps. The bandwidth size for the sample destination group is sixteen and one-half Mbps.

After the bandwidth size of the destination group has been reviewed, the bandwidth size is compared to at least one private bandwidth range. Referring to decision step 128 of FIG. 9, the bandwidth size from step 126 is compared to a first private bandwidth range. In the preferred embodiment, the first private bandwidth range includes a lower bound and an upper bound. In essence, it may be said that the private bandwidth ranges are used as part of the determination as to whether to allocate a destination group as a private segment or as a public segment.

Preferably, the first private bandwidth range can be set to different values by the service provider depending on the needs of the communications network and of customers. In the preferred embodiment, the first private bandwidth range is set near the maximum bandwidth of the smallest segment, or logical pipe, of the optical network. For example, for a STS-1 segment which has a maximum bandwidth of approximately fifty Mbps, the lower bound of the first private bandwidth range may be set to thirty-five Mbps and the upper bound may be set to fifty Mbps so that a destination group with a bandwidth size within the lower and upper bound is sent as a private segment over the STS-1 transport segment.

Referring again to decision step 128, if the bandwidth size is within the first private bandwidth range, a segment identification (ID) is preferably assigned to the destination group at step 130. As will be understood from the discussion above regarding bandwidth allocation, the segment identification assigned at step 130 identifies the segment as a private segment. After assignment of a segment ID in step 130, the data streams in the destination group are multiplexed into a segment at step 132. Preferably, the data streams in the destination group are multiplexed into an STS-N segment, where n is a positive integer.

After the multiplex step 132, in step 134, the private segment is sent to the optical network. At decision step 136, a determination is made as to whether there is another destination group to review. If there is another destination group to review, then the preferred mode returns to step 126 and another destination group is reviewed for bandwidth size. If there is no other destination group to review, then the method ends at step 108.

Still referring to FIG. 9 and returning to decision step 128, if the bandwidth size is less than the first private bandwidth range, then at step 140 the data streams in the destination group are preferably sent to a holding point. Further detail regarding the holding point is presented in connection with Step 176, FIG. 11. The preferred method then proceeds to decision step 136 to determine whether there is another destination group to review. If there is another destination group to review, then the preferred mode returns to step 126 and another destination group is reviewed for bandwidth size. If there is no other destination group to review, then the method ends at step 108.

On the other hand, if, at step 128, the bandwidth size is greater than the first private bandwidth range, then the bandwidth size is preferably compared to a second private bandwidth range at step 142. This comparison is made to determine whether the bandwidth size is greater than the second private bandwidth range or within the second private bandwidth range. Such a determination is made by comparing the bandwidth size to an upper bound and lower bound of the second private bandwidth range. This determination is preferably similar to the determination made at step 128 in connection with the first private bandwidth range.

Referring again to step 142, if the bandwidth size is within the second private bandwidth range, then the destination group is sent to step 144 and a segment identification is assigned to the destination group. The segment identification assigned at step 144 identifies the segment as a private segment. At step 146, the data streams in the destination group are multiplexed into a segment, and at step 148, the segment is sent to the optical network. Next, at step 136, a determination is made as to whether there is another destination group to review. If there is another destination group to review, then the preferred mode returns to step 126 and another destination group is reviewed for bandwidth size. If there is no other destination group to review, then the method ends at step 108.

Returning to step 142, if the bandwidth size of the destination group is greater than the second private bandwidth range, then the bandwidth size is preferably compared to a third private bandwidth range. The preferred method continues comparing the bandwidth size of the destination group with private bandwidth ranges until the bandwidth size is determined to be either within a private bandwidth range, or, larger than any private bandwidth range. These comparison steps follow generally the same process as described above in connection with the first private bandwidth range and the second private bandwidth range. The repetition of these bandwidth range comparisons is indicated by the dashes following the "No" branch of decision step 142.

An embodiment of the present invention provides for the circumstance of the bandwidth size of a particular destination group being larger than any private bandwidth range. In particular, if the bandwidth size of a destination group is larger than any private bandwidth range, then the destination group is rejected.

FIG. 10

Figure 10:
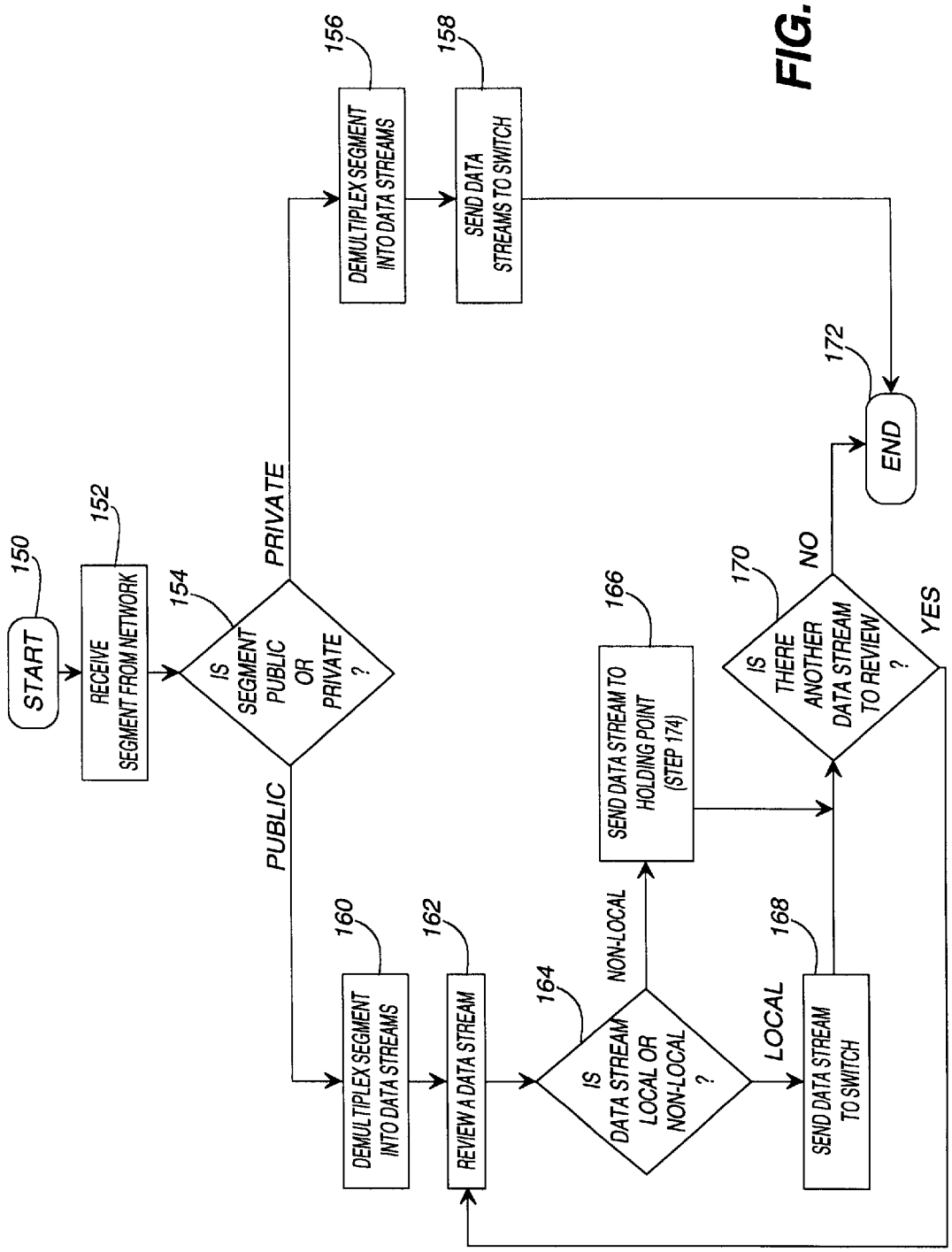
FIG. 10 is a flow chart of the preferred method of dropping a cell from an optical network to an ATM switch.

FIG. 10 is a flow chart of the preferred method of dropping a data stream from an optical network to an ATM switch. The method starts at step 150. At step 152, a segment is received from the optical network 18. The segment At decision step 154, preferably it is determined whether the segment received at step 152 is public or private. This determination of whether a segment is public or private is preferably made by checking the segment identification (ID) of the segment. If it is determined that the segment is private, then the segment is demultiplexed into data streams at step 156. The data streams of step 156 are sent to the ATM switch 17 at step 158, and the method ends in step 172.

Referring again to decision step 154, if it is determined that the segment is public, the segment is demultiplexed into data streams at step 160. At step 162, a data stream from step 160 is reviewed. At decision step 164, it is determined whether the data stream is local or non-local. Preferably, this is done by comparing the virtual path identifier of the data stream with the address of ATM switch 17. If the virtual path identifier of the data stream corresponds to the address of the ATM switch, then the data stream is local. If the virtual path identifier of the data stream does not correspond to the address of ATM switch 17, then the data stream is non-local. If the data stream is non-local, then at step 166 the data stream is sent to the holding point. Additional detail regarding the holding point is provided in connection with step 174, FIG. 11. If the data stream is local, then at step 168 the data stream is sent to the ATM switch.

At step 170, a determination is made as to whether there is another data stream from step 160 to review. If there is another data stream to review, the method returns to step 162. If there is no other data stream to review, the method ends at step 172.

FIG. 11

Figure 11:
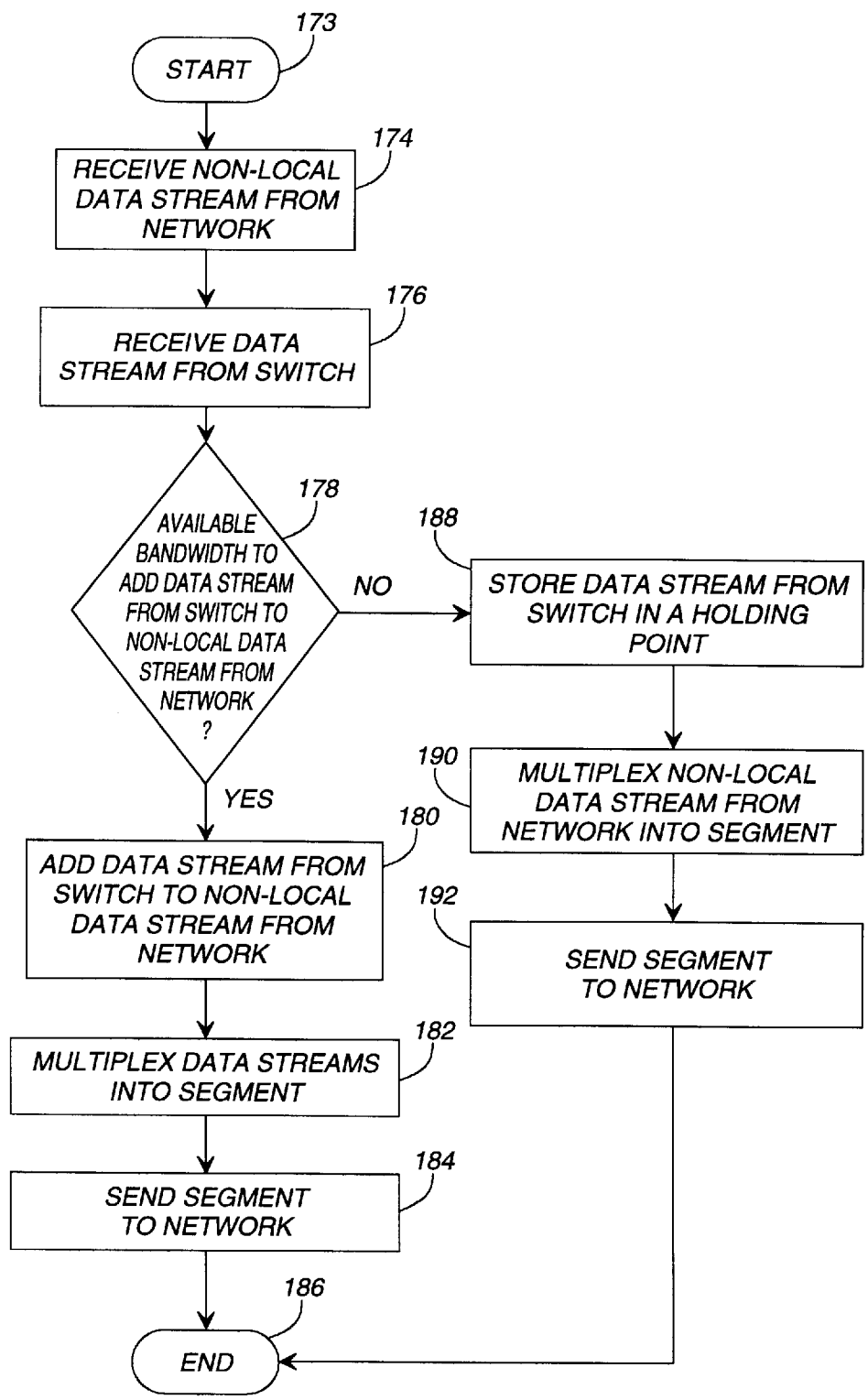
FIG. 11 is a flow chart of the preferred method of adding non-local cells received from the ATM switch to non-local cells received from the optical network.

FIG. 11 is a flow chart of the preferred method of adding non-local data streams received from the ATM switch to non-local data streams received from the optical network. At step 173, the method begins. At step 174, a non-local data stream is received from the optical network. Necessarily, a non-local data stream from the optical network had been part of a public segment received in connection with the processing steps of the present invention. Reference is made to step 166, where, after a public segment had been demultiplexed into data streams, any non-local data streams were sent to the holding point for further processing.

At step 176, a data stream is received from the ATM switch. The data stream is not preferably received directly from the switch, but rather, received after a review of the bandwidth size of the destination group including the data stream. Reference is made to step 140, FIG. 9 where, a data stream of a destination group with a bandwidth size less than the first private bandwidth range had been sent to the holding point.

It should be noted that steps 174 and 176 need not both occur, nor occur in the order listed. Regardless of the origin of the data stream, the process steps 178–186 are preferably carried out.

At decision step 178, the bandwidth of the non-local data streams from the optical network are added together and compared with the bandwidth capacity of the public segment from step 160 to determine if there is any available bandwidth capacity on the public segment. Preferably, if there is available bandwidth in the public segment to add the data streams from the ATM switch to the non-local data streams from the optical network, then the data streams from the ATM switch are added to the non-local data streams from the optical network at step 180. At step 182, the data streams that were added at step 180 are multiplexed into a public segment. The segment already has a segment identification as a public segment because the segment identification is carried over with the non-local data streams from step 160, FIG. 10. The segment from step 182 is sent to the optical network at step 184. The method ends at step 186.

The flowchart of FIG. 11 illustrates that preferably the non-local data stream of a public segment that is dropped from the optical network is added to a non-local data stream from the ATM switch. The added non-local data streams are multiplexed and are sent as a public segment over the optical network. Thus, preferably, a public segment may contain data streams that originate from different ATM switches and that are being sent to different ATM switches. On the other hand, a private segment contains data streams that originate from one ATM switch and each data stream in the private segment goes to the same destination or destinations as every other data stream in the private segment.

Returning to decision step 178, if bandwidth is unavailable to add the data stream from the ATM switch to the non-local data stream from the optical network, then the data stream from the ATM switch is stored in a holding point at step 188. The data stream from the ATM switch is stored in the holding point until there is available bandwidth in a public segment to send the data stream to the optical network. Preferably, the holding point is a buffer. At step 190, the non-local data stream from the optical network is multiplexed into a public segment. The non-local data stream from the optical network retains its segment identification as a public segment. At step 192, the public segment from step 192 is sent to the optical network. At step 186, the method ends.

Given the foregoing disclosure of the preferred embodiment and design parameters for the present invention, other embodiments of the present invention will suggest themselves to those skilled in the art. Therefore, the scope of the present invention is to be limited only by the claims below.

I claim:

1. A method for maximization of the use of bandwidth capacity of an optical network when adding a data stream received from a switch to said optical network, comprising the steps of:
   receiving said data stream from said switch;
   determining whether said data stream is a non-local data stream,
   in response to determining that said data stream is a non-local data stream, grouping said data stream into a destination group, said destination group including a plurality of data streams having a common routing characteristic; and
   sending said destination group to said optical network.

2. The method of claim 1, wherein said step of grouping said data stream into said destination group comprises:
   determining whether said data stream corresponds to said destination group; and
   if said data stream corresponds to said destination group, then adding said data stream to said destination group.

3. The method of claim 1, wherein said step of grouping said data stream into said destination group comprises:
   determining whether said data stream corresponds to said destination group; and
   if said data stream fails to correspond to said destination group, then creating a new destination group and adding said data stream to said new destination group.

4. The method of claim 2, wherein said step of determining whether said data stream corresponds to said destination group comprises checking a virtual path identifier of said data stream for correspondence to said destination group.

5. The method of claim 1, wherein said step of sending said destination group to said optical network comprises:
   reviewing the bandwidth size of said destination group; and
   if said bandwidth size of said destination group is less than a private bandwidth range, then sending said destination group to a holding point.

6. The method of claim 1, wherein said step of sending said destination group to said optical network comprises:
   reviewing the bandwidth size of said destination group; and
   only if said bandwidth size of said destination group is within a private bandwidth range, then
      multiplexing said data stream in said destination group into a segment, and
      sending said segment to said optical network.

7. The method of claim 1, wherein said step of sending said destination group to said optical network comprises:
   reviewing the bandwidth size of said destination group;
   if said bandwidth size of said destination group is greater than a first private bandwidth range, then comparing said bandwidth size of said destination group with a second private bandwidth range; and
   only if said bandwidth size of said destination group is within said second private bandwidth range, then
      multiplexing said data stream in said destination group into a segment, and
      sending said segment to said optical network.

8. The method of claim 1, wherein said data stream comprises a first data stream, and further comprising the steps of:
   receiving a second data stream from said switch;
   determining whether said second data stream is a local data stream; and
   if said second data stream is said local data stream, then returning said second data stream to said switch.

9. The method of claim 8, wherein said step of determining whether said second data stream is said local data stream comprises checking a virtual path identifier of said second data stream for correspondence to said switch.

10. A method for providing an interface between a switch and an optical network by adding a data stream or a non-local data stream to said optical network and by dropping a data stream or a local data stream to said switch, comprising the steps of:
    receiving a data stream from said switch, and in response thereto,
    grouping said data stream into a destination group, and sending said destination group to said optical network;
    receiving a private segment from said optical network, and in response thereto,
    demultiplexing said private segment into at least a first data stream, and
    sending said first data stream to said switch; and
    receiving a public segment from said optical network, and in response thereto,
    demultiplexing said public segment into at least a second data stream,
    if said second data stream is a local data stream, then sending said local data stream to said switch, and
    if said second data stream is a non-local data stream, then sending said non-local data stream to said optical network.

11. The method of claim 1, wherein said step of determining whether said data stream is a non-local data stream comprises determining whether a virtual path identifier associated with said data stream includes routing information for sending said data stream over said optical network.

12. A method for maximization of the use of bandwidth capacity of an optical network when adding a data stream received from a switch to said optical network, comprising the steps of:
   receiving said data stream from said switch;
   grouping said data stream into a destination group;
   reviewing the bandwidth size of said destination group; and
   if said bandwidth size of said destination group is less than a private bandwidth range, then sending said destination group to a holding point.

13. A method for maximization of the use of bandwidth capacity of an optical network when adding a data stream received from a switch to said optical network, comprising the steps of:
   receiving said data stream from said switch;
   grouping said data stream into a destination group;
   reviewing the bandwidth size of said destination group; and
   only if said bandwidth size of said destination group is within a private bandwidth range, then
      multiplexing said data stream in said destination group into a segment, and
      sending said segment to said optical network.

14. A method for maximization of the use of bandwidth capacity of an optical network when adding a data stream received from a switch to said optical network, comprising the steps of:
   receiving said data stream from said switch;
   grouping said data stream into a destination group;
   reviewing the bandwidth size of said destination group;
   if said bandwidth size of said destination group is greater than a first private bandwidth range, then comparing said bandwidth size of said destination group with a second private bandwidth range; and
   only if said bandwidth size of said destination group is within said second private bandwidth range, then
      multiplexing said data stream in said destination group into a segment, and
      sending said segment to said optical network.

15. A method for maximization of the use of bandwidth capacity of an optical network when adding a data stream received from a switch to said optical network, comprising the steps of:
   receiving a first data stream from said switch;
   grouping said first data stream into a destination group;
   sending said destination group to said optical network;
   receiving a second data stream from said switch;
   determining whether said second data stream is a local data stream, said determination including checking a virtual path identifier of said second data stream for correspondence to said switch; and
   if said second data stream is a local data stream, then returning said second data stream to said switch.

* * * * *